United States Patent
Katsuyama et al.

(10) Patent No.: US 12,306,435 B2
(45) Date of Patent: May 20, 2025

(54) OPTICAL MULTIPLEXER AND MANUFACTURING METHOD FOR THE SAME

(71) Applicant: University of Fukui, Fukui (JP)

(72) Inventors: Toshio Katsuyama, Fukui (JP); Shoji Yamada, Fukui (JP); Akira Nakao, Fukui (JP); Susumu Yonezawa, Fukui (JP)

(73) Assignee: University of Fukui, Fukui (JP)

( * ) Notice: Subject to any disclaimer, the term of this patent is extended or adjusted under 35 U.S.C. 154(b) by 282 days.

(21) Appl. No.: 17/976,134

(22) Filed: Oct. 28, 2022

(65) Prior Publication Data
US 2023/0273368 A1 Aug. 31, 2023

(30) Foreign Application Priority Data
Feb. 25, 2022 (JP) .................. 2022-028216

(51) Int. Cl.
*G02B 6/12* (2006.01)
*G02B 6/13* (2006.01)

(52) U.S. Cl.
CPC .......... *G02B 6/12007* (2013.01); *G02B 6/13* (2013.01)

(58) Field of Classification Search
CPC ............................ G02B 6/12007; G02B 6/13
See application file for complete search history.

(56) References Cited

U.S. PATENT DOCUMENTS

| | | | |
|---|---|---|---|
| 7,130,503 B2 * | 10/2006 | Terakawa ........... | G02B 6/12007 398/43 |
| 2018/0306978 A1 * | 10/2018 | Kagawa ............. | G02B 6/12007 |
| 2021/0165163 A1 * | 6/2021 | Sakamoto ........... | G02B 6/2813 |

FOREIGN PATENT DOCUMENTS

| | | |
|---|---|---|
| JP | 2013-195603 A | 9/2013 |
| WO | 2017/065225 A1 | 4/2017 |

OTHER PUBLICATIONS

Nakao et al., "Highly-efficient waveguide-type red-green-blue laser beam combiners for compact projection-type displays", Optics Communications, Dec. 15, 2021, vol. 501, 127335. Cited in Specification (5 pages).

* cited by examiner

*Primary Examiner* — Michelle R Connelly
*Assistant Examiner* — Marc E Manheim
(74) *Attorney, Agent, or Firm* — WHDA, LLP

(57) ABSTRACT

An optical multiplexer includes a first and a second optical waveguides, and a multiplexing unit. The first and second optical waveguides have a first and a second mode coupling regions being proximate to each other with a predetermined gap width, the optical waveguides in the coupling regions form the multiplexing unit. Light transfers between the optical waveguides in the first and second mode coupling regions, first light in the optical waveguide in the first mode coupling region and second light in the optical waveguide in the first or second mode coupling regions having the wavelength different from the first light are multiplexed to one of the waveguides in the mode coupling regions, and the core cross-section of the optical waveguide at least in the first and second mode coupling regions in the first and second optical waveguides is asymmetric in the height direction.

12 Claims, 24 Drawing Sheets

(1) PLAN DIAGRAM SHOWING MULTIPLEXER (2) SIDE DIAGRAM WHERE MULTIPLEXER IS VIEWED IN THE LEFT DIRECTION (1) PLAN DIAGRAM SHOWING MULTIPLEXER (2) SIDE DIAGRAM WHERE MULTIPLEXER IS VIEWED IN THE LEFT DIRECTION (1) PLAN DIAGRAM SHOWING MULTIPLEXER (2) SIDE DIAGRAM WHERE MULTIPLEXER IS VIEWED IN THE LEFT DIRECTION (1) RED TRANSFERS AND BLUE PROPAGATES STRAIGHT FORWARD (2) RED RETURNS BACK AND BLUE TRANSFERS (3) RED TRANSFERS AND BLUE ALSO TRANSFERS (1) CROSS-SECTION OF DIRECTIONAL COUPLER
FORMED OF RECTANGULAR WAVEGUIDES (2) CROSS-SECTION OF DIRECTIONAL COUPLER
FORMED OF TRAPEZOIDAL WAVEGUIDES (1) RECTANGULAR CROSS-SECTION
(TOP BASE/BOTTOM BASE RATIO: 1)

(2) TRAPEZOIDAL CROSS-SECTION
(TOP BASE/BOTTOM BASE RATIO: 0 THROUGH 1)

TOP BASE/BOTTOM BASE RATIO = $(w - 2x)/w$ (3) TRIANGULAR CROSS-SECTION
(TOP BASE/BOTTOM BASE RATIO: 0 OR LESS)

(4) REVERSE TRAPEZOIDAL CROSS-SECTION
(TOP BASE/BOTTOM BASE RATIO: NOT LESS THAN 1)

(5) TWO-TIERED CORE CROSS-SECTION (6) TRAPEZOIDAL CROSS-SECTION
(CASE WHERE ONE LATERAL SIDE OF TRAPEZOID IS VERTICAL AND
THE OTHER IS DIAGONAL)
(TOP BASE/BOTTOM BASE RATIO: 0 THROUGH 1)

(7) DIRECTIONAL COUPLER WHERE GAP
BETWEEN WAVEGUIDES IS FILLED IN (1) RELATIONSHIP BETWEEN DIFFERENCE IN B/R RATIO BETWEEN MAXIMUM VALUE AND MINIMUM VALUE AND TOP BASE/BOTTOM BASE RATIO (2) RELATIONSHIP BETWEEN STANDARD DEVIATION OF B/R RATIO AND TOP BASE/BOTTOM BASE RATIO

GAP BETWEEN WAVEGUIDES w= 4μm (1) RELATIONSHIP BETWEEN DIFFERENCE IN B/R RATIO BETWEEN MAXIMUM VALUE AND MINIMUM VALUE AND TOP BASE/BOTTOM BASE RATIO (2) RELATIONSHIP BETWEEN STANDARD DEVIATION OF B/R RATIO AND TOP BASE/BOTTOM BASE RATIO

REFRACTIVE INDEX = 1.1%,
DISTANCE BETWEEN WAVEGUIDES w = 3.4 μm (1) RELATIONSHIP BETWEEN DIFFERENCE IN B/R RATIO BETWEEN MAXIMUM VALUE AND MINIMUM VALUE AND TOP BASE/BOTTOM BASE RATIO (2) RELATIONSHIP BETWEEN STANDARD DEVIATION OF B/R RATIO AND TOP BASE/BOTTOM BASE RATIO

DISTANCE BETWEEN WAVEGUIDES w = 4 μm,
WAVEGUIDE HEIGHT h = 1.2 μm (1) RELATIONSHIP BETWEEN DIFFERENCE IN B/R RATIO BETWEEN MAXIMUM VALUE AND MINIMUM VALUE AND TOP BASE/BOTTOM BASE RATIO (2) RELATIONSHIP BETWEEN STANDARD DEVIATION OF B/R RATIO AND TOP BASE/BOTTOM BASE RATIO

WAVEGUIDES WITH TWO-TIERED CORE (1) RELATIONSHIP BETWEEN DIFFERENCE IN B/R RATIO BETWEEN MAXIMUM VALUE AND MINIMUM VALUE AND TOP BASE/BOTTOM BASE RATIO (2) RELATIONSHIP BETWEEN STANDARD DEVIATION OF B/R RATIO AND TOP BASE/BOTTOM BASE RATIO

WHERE CORE CROSS-SECTION IS TRAPEZOID HAVING ONE LATERAL SIDE BEING VERTICAL (1) RELATIONSHIP BETWEEN DIFFERENCE IN B/R RATIO BETWEEN MAXIMUM VALUE AND MINIMUM VALUE AND RATIO OF HEIGHT BY WHICH GAP IS FILLED IN TO WAVEGUIDE HEIGHT (2) RELATIONSHIP BETWEEN STANDARD DEVIATION OF B/R RATIO AND RATIO OF HEIGHT BY WHICH GAP IS FILLED IN TO WAVEGUIDE HEIGHT

WAVEGUIDES WHERE GAP BETWEEN WAVEGUIDES IS FILLED IN (3) RELATIONSHIP BETWEEN STANDARD DEVIATION OF B/R RATIO AND RATIO OF HEIGHT BY WHICH GAP IS FILLED IN TO WAVEGUIDE HEIGHT (CASE OF STRUCTURES OF THREE TYPES OF REPRESENTATIVE WAVEGUIDES)

$L_T$: LENGTH OF TOP BASE
$L_B$: LENGTH OF BOTTOM BASE
$L_S$: LENGTH OF LATERAL SIDE
D: AMOUNT OF ROUNDNESS OF EACH CORNER OR CURVATURE OF A SIDEWALL or TOP BASE, BOTTOM BASE (1) ROUNDNESS OF CORNER (2) CURVATURE OF SIDEWALL (3) CURVATURE OF TOP BASE OR BOTTOM BASE (1) PLAN DIAGRAM SHOWING MULTIPLEXER (2) CROSS-SECTIONAL DIAGRAM ALONG CROSS-SECTION CS1

(1) PLAN DIAGRAM SHOWING MULTIPLEXER (2) CROSS-SECTIONAL DIAGRAM ALONG CROSS-SECTION CS2

(1) EXAMPLE OF OPTICAL WAVEGUIDE-TYPE
MULTIPLEXER (3) (PLAN DIAGRAM)

(2) EXAMPLE OF OPTICAL WAVEGUIDE-TYPE
MULTIPLEXER (4) (PLAN DIAGRAM)

OPTICAL MULTIPLEXER AND MANUFACTURING METHOD FOR THE SAME

CROSS-REFERENCE TO RELATED APPLICATION

This application is based upon and claims the benefit of priority of the prior Japanese Patent Application No. 2022-028216, filed on Feb. 25, 2022, the entire contents of which are incorporated herein by reference.

FIELD

The present invention relates to an optical waveguide-type optical multiplexer that is used for a light beam scanning-type image projector and the like and a manufacturing method for the same.

BACKGROUND

In light beam scanning-type image projectors for projecting an image on a screen or the like by scanning a light beam on the screen, an optical multiplexer for multiplexing three primary light colors, red, blue, and green, into one beam in order to project a color image. In particular, in a glass-type display for projecting an image onto retinas, it is required to miniaturize such an optical multiplexer. For example, Patent Literature 1 through 3 and Non-Patent Literature 1 disclose a miniaturized optical waveguide-type multiplexer. In these optical multiplexers, red, blue, and green light beams are allowed to enter through the entrance end of different optical waveguides so that these beams can be multiplexed, and after that, the multiplexed light beam is emitted through the output end of one optical waveguide.

CITATION LIST

Patent Literature

Patent Literature 1: Japanese Unexamined Patent Publication 2013-195603
Patent Literature 2: WO2017/065225 A1

Non-Patent Literature

Non-Patent Literature 1: Akira Nakao, Shoji Yamada, Toshio Katsuyama, "Highly-Efficient Waveguide-Type Red-Green-Blue Laser Beam Combiners for Compact Projection-Type Displays," Optics Communications, Vol. 501, 15 Dec. 2021, 127335

SUMMARY

FIG. 1 is a plan diagram and a side diagram showing the configuration of the optical waveguide-type multiplexer in Patent Literature 1. The side diagram of FIG. 1 shows the left end of the configuration in the plan diagram of FIG. 1. The optical waveguide-type multiplexer 100 shown in FIG. 1 has first through third optical waveguides 101 through 103 and first through third multiplexing units 110 through 130. The first through third optical waveguides are usually embedded within a clad layer 112 that is formed on a substrate 111. The first multiplexing unit 110 and the third multiplexing unit 130 are optical directional couplers that are formed of optical waveguides in mode coupling regions 103c in which the second and third optical waveguides 102, 103 are proximate each other with predetermined gap widths gw1 and gw3 in-between over predetermined lengths L1 and L3. Likewise, the second multiplexing unit 120 is an optical directional coupler that is formed of optical waveguides in a mode coupling region 101c in which the first and second optical waveguides 101, 102 are proximate each other with a predetermined gap width gw2 in-between over a predetermined length L2.

Turning to the second multiplexing unit 120, this optical directional coupler has an S-shaped waveguide 101s within the first optical waveguide 101, the optical waveguide 101 in the linear mode coupling region 101c with a predetermined length L2, and another S-shaped waveguide 101s, and furthermore has an optical waveguide in a linear mode coupling region with a predetermined length L2 within the second optical waveguide 102. The region with a length L2 that is proximate to the waveguide 101 in the mode coupling region 101c within the first optical waveguide 101 with a gap width gw2 in-between corresponds to the mode coupling region in the second optical waveguide 102. The first multiplexing unit 110 and the third multiplexing unit 130 have the same structure.

In the following, optical waveguides are simply referred to as waveguides in some cases. Thus, optical waveguides and waveguides are the same unless otherwise stated. In addition, optical directional couplers are simply referred to as directional couplers in some cases.

In the case where the optical multiplexer in FIG. 1 is used, the optical multiplexing method is as follows. Initially, the first visible light (usually red light R) that has entered through the entrance end 101a of the first waveguide 101 mode couples with and transfers into the second waveguide 102 through the second multiplexing unit 120, and after that mode couples with and transfers into the third waveguide 103 through the third multiplexing unit 130 so as to propagate, then returns to the second waveguide 102, and is emitted through the emission end 102b of the second waveguide 102.

Next, the second visible light (usually green light G) that has entered through the entrance end 102a of the second waveguide 102 mode couples with and transfers into the third waveguide 103 through the first multiplexing unit 110, after that mode couples with and transfers into the second waveguide 102 through the third multiplexing unit 130 so as to propagate, and is emitted through the emission end 102b of the second waveguide 102.

Furthermore, part of the third visible light (usually blue light B) that has entered through the entrance end 103a of the third waveguide 103 mode couples with and transfers into the second waveguide 102 through the first multiplexing unit 110 so as to propagate, and the rest of the third visible light propagates through the third waveguide 103 as it is, after that transfers into the second waveguide 102 through the third multiplexing unit 130 so as to be multiplexed with the third visible light B that has propagated through the second waveguide 102, and is emitted through the emission end 102b of the second waveguide 102. As described above, all of the light emits through the emission end 102b of the same second waveguide 102.

FIG. 2 is a plan diagram and a side diagram showing the configuration of the optical waveguide-type multiplexer in Patent Literature 2. The side diagram in FIG. 2 shows the left end of the configuration in the plan diagram. The optical waveguide-type multiplexer 200 in FIG. 2 has first through third waveguides 101 through 103 and first and second multiplexing units 110 and 120. The first through third waveguides are embedded within the clad layer 112 that is formed on a substrate 111. In the same manner as in FIG. 1, the first multiplexing unit 110 and the second multiplexing unit 120 are also optical directional couplers having a couple of optical waveguides that are proximate to each other with a gap width gw1 or gw2 in-between respectively in a mode coupling region with a predetermined length.

In the case where the optical multiplexer in FIG. 2 is used, the optical multiplexing method is as follows. Initially, the first visible light (usually red light R) that has entered through the entrance end 102a of the second waveguide 102 mode couples with and transfers into the third waveguide 103 through the first multiplexing unit 110, and returns to the second waveguide within the first multiplexing unit 110 so as to propagate, and subsequently, transfers into the first waveguide 101 through the second multiplexing unit 120, and again returns to the second waveguide within the second multiplexing unit 120 so as to be emitted through the emission end 102b of the second waveguide 102.

Next, the second visible light (usually green light G) that has entered through the entrance end 103a of the third waveguide 103 mode couples with and transfers into the second waveguide 102 through the first multiplexing unit 110 so as to propagate, and transfers into the first waveguide 101 through the second multiplexing unit 120, and after that returns to the second waveguide within the second multiplexing unit 120 so as to be emitted through the emission end 102b of the second waveguide 102.

In addition, the third visible light (usually blue light B) that has entered through the entrance end 101a of the first waveguide 101 mode couples with and transfers into the second waveguide 102 through the second multiplexing unit 120 so as to be emitted through the emission end 102b of the second waveguide 102. As described above, all the light is emitted through the emission end 102b of the same second waveguide 102.

Here, the multiplexing units of these optical waveguide-type multiplexers are mainly formed of an optical directional coupler as shown in Non-Patent Literature 1. In the optical directional couplers, two optical waveguides through which different light propagates are allowed to approach each other in a mode coupling region with a gap width between the two optical waveguides and a length that allow light propagating through one optical waveguide to be able to transfer into the other optical waveguide, and thus, the light path is changed by utilizing the phenomenon (mode coupling) where propagating light transfers between optical waveguides.

Such an optical directional coupler has the two following problems. First, as shown in the side diagrams of FIGS. 1 and 2, the optical waveguides 101 through 103 that form the optical directional coupler are embedded within the clad layer 112 that is formed on the substrate 111. In this case, it is necessary for the gap width between the two waveguides to be reduced to the length of a micron level in order to make it easy for light to transfer. Therefore, the dispersion of the gap width becomes great according to the reduction in the gap in the manufacture of the optical directional coupler. As a result of this, such a problem arises that the variation in the dimensions of the mode coupling causes the dispersion in the multiplexing properties of the optical waveguide-type multiplexer. Consequently, the yield in the fabrication of the optical waveguide multiplexer deteriorates, and thus, the productivity of the manufacture is lowered, which is a significant problem in the industry.

Secondly, a problem arises that the efficiency of the mode coupling of the optical directional coupler itself is poor as the optical multiplexing unit. That is to say, the difference in the mode coupling of light is small in the optical directional coupler even between red light and blue light where the difference in the wavelengths is the greatest from among the three primary colors, red, green, and blue, and thus, there is a problem where the multiplexing performance is poor, meaning one propagating light transfers between waveguides, whereas the other propagating light does not transfer. Namely, a problem arises that the difference in the mode coupling is small between red light and blue light, so the difference in the transfer properties between waveguides in the multiplexing unit is small between read light and blue light, and the multiplexing performance of the optical directional coupler is not high.

Therefore, an object of the first aspect of the present embodiment is to provide an optical multiplexer where any of these problems with the optical multiplexer is solved, and a manufacturing method for such an optical multiplexer.

A first aspect of the present embodiment is an optical multiplexer including a first optical waveguide, a second optical waveguide, and at least one multiplexing unit, wherein the first and second optical waveguides respectively have a first mode coupling region and a second mode coupling region that have a predetermined length and are proximate to each other with a predetermined gap width in between, the optical waveguides in the first and second mode coupling regions form the multiplexing unit, light transfers between the optical waveguides in the first and second mode coupling regions in the multiplexing unit, first light in the optical waveguide in the first mode coupling region and second light in the optical waveguide in the first or second mode coupling regions having the wavelength different from that of the first light are multiplexed to one of the waveguides in the first and second mode coupling regions in the multiplexing unit, and the core cross-section of the optical waveguide at least in the first and second mode coupling regions in the first and second optical waveguides is asymmetric in the height direction.

According to the first aspect, the dispersion in the multiplexing properties of the waveguide-type multiplexer caused by the dispersion in the gap width between the waveguides of the optical multiplexer due to the dispersion during the manufacturing process can be reduced. In addition, the efficiency in the mode coupling of the directional coupler itself (multiplexing properties of the optical multiplexer) can be increased.

DESCRIPTION OF EMBODIMENTS

In the following, the present embodiment is described in reference to the drawings.

Figure 3:
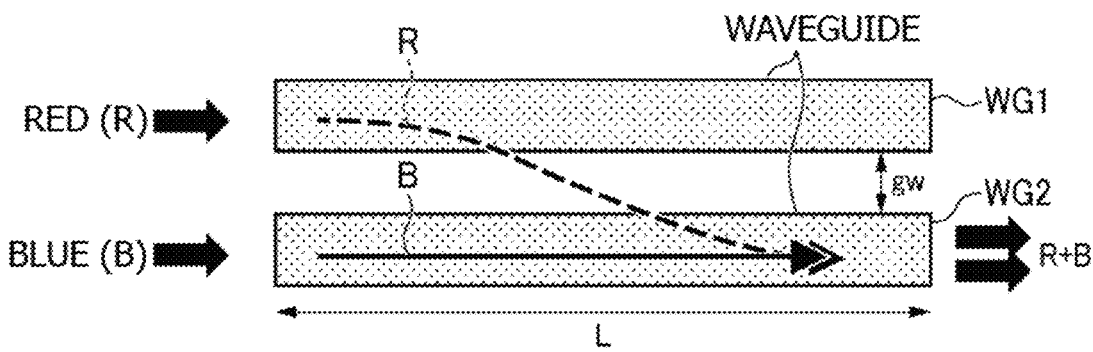
FIG. 3 is a diagram showing examples of the main operation of the optical directional coupler (multiplexing unit) that forms the optical waveguide-type multiplexer according to the present embodiment.
Figure 3:
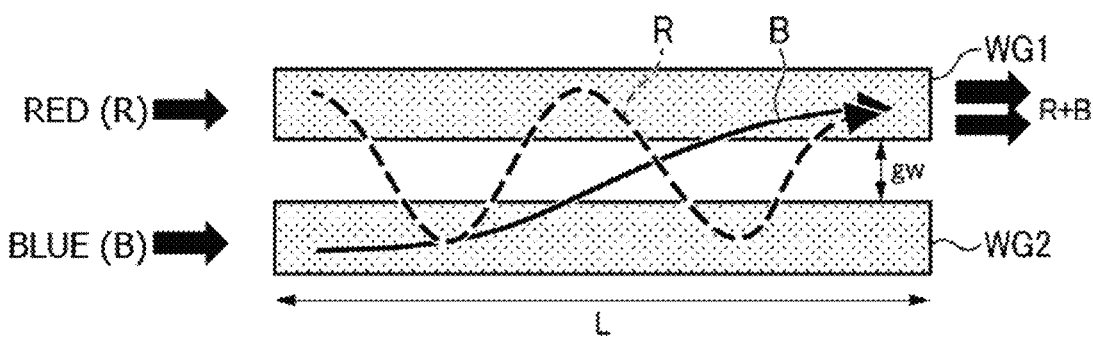
Figure 3:
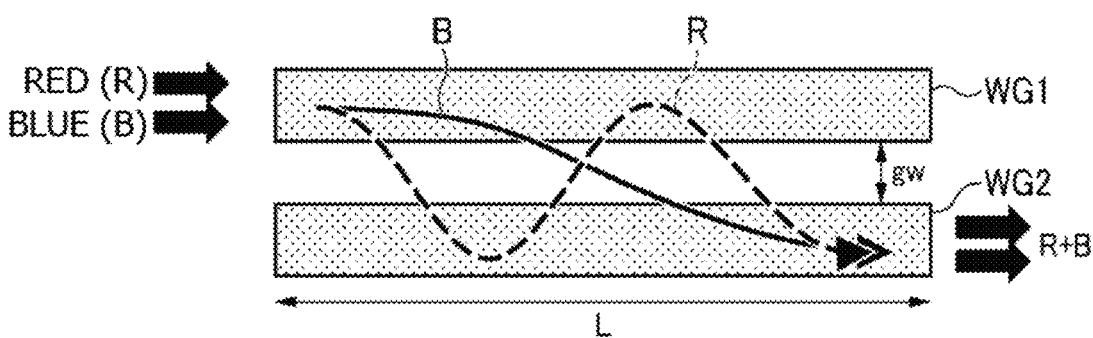

Examples of the Main Operation of the Optical Directional Coupler (Multiplexing Unit) that Forms the Optical Waveguide-type Multiplexer FIG. 3 is a diagram showing examples of the main operation of the optical directional coupler (multiplexing unit) that forms the optical waveguide-type multiplexer according to the present embodiment. The examples of the operation in the optical directional coupler include three types of operational examples of FIG. 3 which relates to red and blue from among the three primary colors.

The optical directional coupler that forms the multiplexing unit has two linear optical waveguides WG1 and WG2 with a predetermined length L that are aligned side-by-side so as to be proximate to each other with a short gap width gw. When the gap width between the two optical waveguides is short, the field of light that propagates through an optical waveguide exudes over the interface between the core and the clad of the optical waveguide, and thus can reach the adjacent optical waveguide. This phenomenon relates to the properties of the waves of light, which are referred to as evanescent waves. That is to say, light that is propagating through one optical waveguide gradually transfers to the adjacent optical waveguide, and finally, the light completely transfers. This length of the portion of the optical waveguides that allows light to completely transfer is the coupling length.

In the case where the length L of the optical waveguides in the optical directional coupler is made half of the coupling length, only 50% of the propagating light transfers between the optical waveguides through the mode coupling of light in such a manner that the light is distributed to the two optical waveguides at a ratio of 50:50. In the case where the gap width between the two optical waveguides is sufficiently widened outside the optical directional coupler, the light that has been distributed into the two optical waveguides propagates through the respective optical waveguides while maintaining the ratio of 50:50. In the case where the length of the optical waveguides in the optical directional coupler is made the same as the coupling length, the light that propagates through one optical waveguide completely transfers to the other optical waveguide. Furthermore, in the case where the length of the optical waveguides is made two times greater than the coupling length, the light that propagates through one optical waveguide transfers to the other optical waveguide, and after that returns to the original optical waveguide. In the case where the length is made three times greater than the coupling length, the light transfers three times, and thus, the light that propagates through one optical waveguide repeats the transfer three times, and finally transfers to the other optical waveguide.

In addition, the longer the wavelength of light is, the wider the field of light is and the greater the length by which light exudes over the border of the optical waveguide is, which makes the optical mode coupling stronger and the coupling length shorter. Accordingly, the coupling length L establishes the relationship of LR<LG<LB in terms of three colors of light, red R, green G, and blue B, due to the relationship of the wavelength λ of λR>λG>λB.

As described above, the mode coupling relates to the expansion (exudation) of the propagating light from the optical waveguide, and the smaller the gap width with the adjacent optical waveguide is, the easier it is for light to reach the adjacent optical waveguide, and as a result, the easier it is for light to transfer to the adjacent optical waveguide. When the wavelength of light is long, the amount of such exudation is great, and thus, the mode coupling is greater for red light than blue light. Accordingly, light with a long wavelength can transfer to the adjacent optical waveguide even when the mode coupling region is short.

In the Operational Example (1), red light R and blue light B are allowed to enter different optical waveguides WG1 and WG2 that are adjacent to each other in such a manner that the red R transfers from the optical waveguide WG 1, into which the red R has entered, to the other optical waveguide WG2, while the blue B propagates straight forward through the optical waveguide WG2 into which the blue B has entered. Thus, the red R and the blue B are both emitted after being multiplexed from the optical waveguide WG2 into which the blue has entered. The Operational Example (1) corresponds to the operation of the second multiplexing unit 120 in (1) of FIG. 1.

In the Operational Example (2), red light R and blue light B enter different optical waveguides WG1 and WG2, the red R once transfers to the other optical waveguide WG2, and in some cases repeats the transfer between the two optical waveguides several times, and finally returns to the optical waveguide WG1 into which the red has originally entered, whereas the blue B transfers from the optical waveguide WG2 into which the blue B has entered to the other optical waveguide WG1. Then, the red R and the blue B are both emitted, after being multiplexed, from the optical waveguide WG1 into which the red has entered. This Operational Example (2) corresponds to the operation of the second multiplexing unit 120 in (1) of FIG. 2.

In the Operational Example (3), red light R and blue light B enter into the same optical waveguide WG1, the red R once transfers into the other optical waveguide WG2, and in some cases repeats the transfer between the two optical waveguides several times so as to finally transfer to the other optical waveguide WG2, whereas the blue B also transfers from the optical waveguide WG1 into which the blue B has entered to the other optical waveguide WG2. Thus, the red R and the blue B both are emitted, after being multiplexed, from the optical waveguide WG2, that is the other optical waveguide WG1 into which the two, red and blue, have entered. The Operational Example (3) is one of the principal operations that are used in the multiplexing unit in the below-described embodiment, though it is not used in the multiplexing units shown in FIGS. 1 and 2. The systems for these Operational Examples (1), (2), and (3) can be combined to form an optical waveguide-type multiplexer.

In the principal operational example of the above-described multiplexing unit, the multiplexing units in the present specification allow one or two of at least two light beams having different wavelengths that enter into (propagate through) the pair of optical waveguides (the optical waveguides in a pair of mode coupling regions) of the directional coupler to transfer from the optical waveguide in the first mode coupling region to the optical waveguide in the second mode coupling region so as to be multiplexed to the light in either of the optical waveguides of the pair of optical waveguides in the first and second mode coupling regions, and after that, the multiplexed light is emitted (propagates) from the optical waveguide where it has been multiplexed. The two light beams that enter into and propagate through the directional coupler enter into each of the pair of optical waveguides separately in some cases (Operational Example (1) or (2) in FIG. 3), or enter into one of the pair of optical waveguides together in other cases (Operational Example (3) in FIG. 3).

Figure 1:
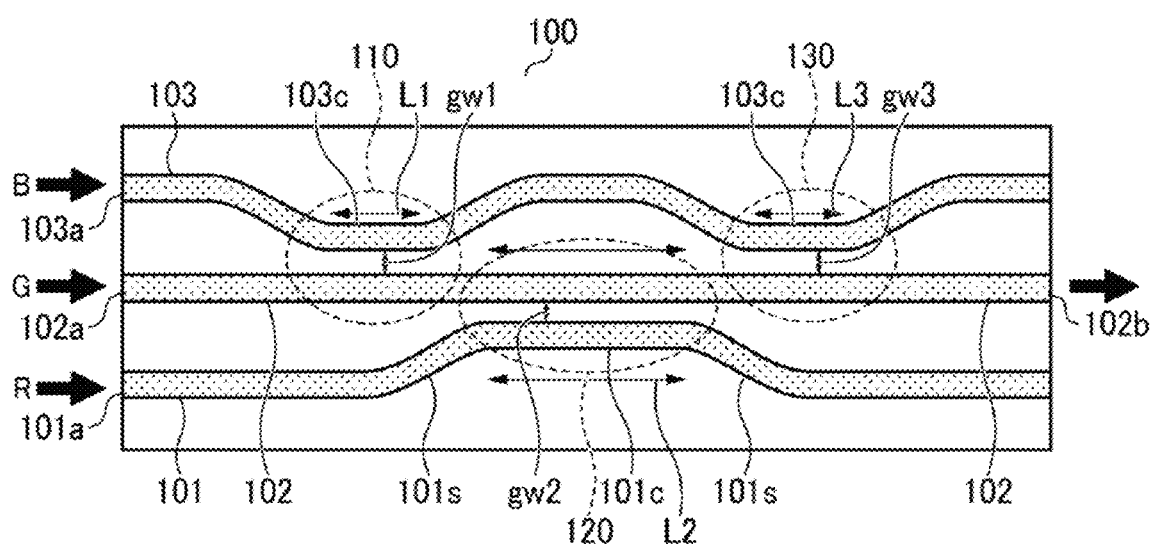
FIG. 1 is a plan diagram and a side diagram showing the configuration of the optical waveguide-type multiplexer in Patent Literature 1.
Figure 1:
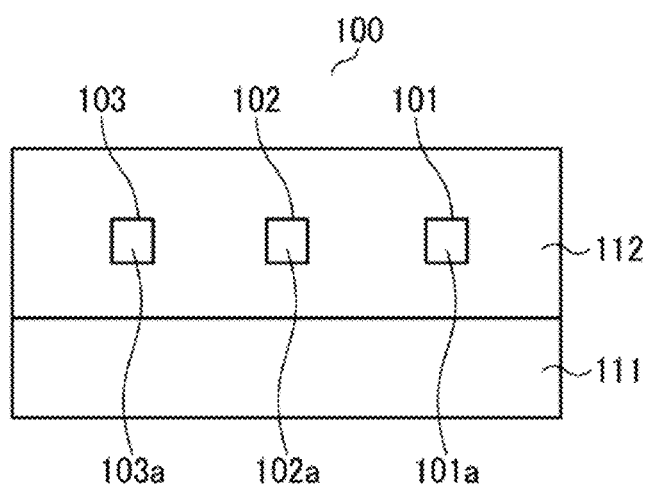
Figure 2:
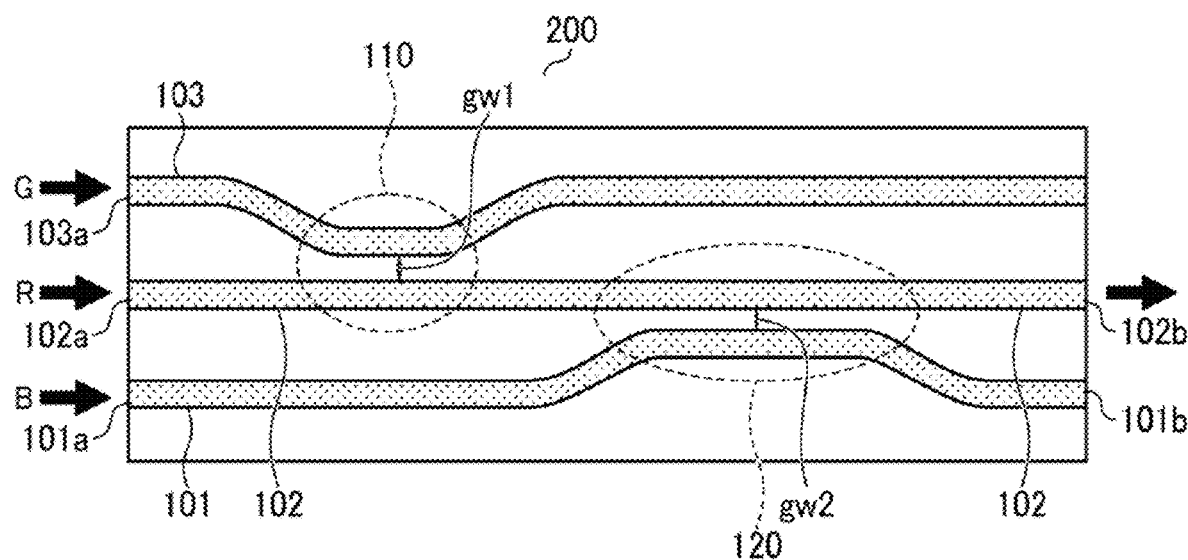
FIG. 2 is a plan diagram and a cross-sectional diagram showing the configuration of the optical waveguide-type multiplexer in Patent Literature 2.
Figure 2:
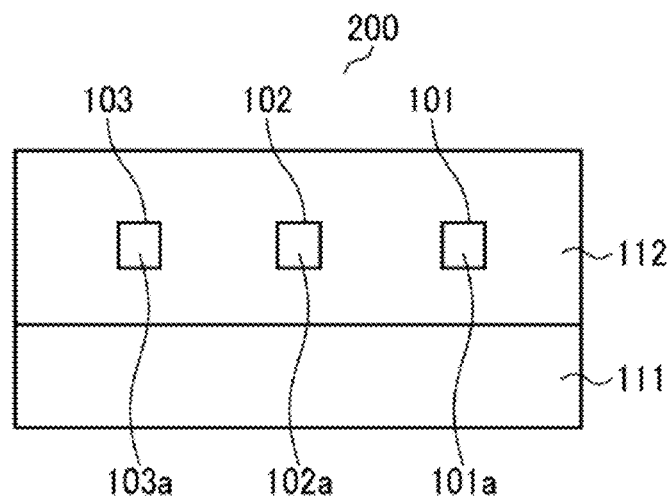

Here, the Operational Examples (1), (2), and (3) in FIG. 3 are described by using a directional coupler formed of two linear waveguides; however, as shown in FIGS. 1 2, a pair of optical waveguides 101s in S-shape made of curves are connected respectively to the left and right ends of the pair of optical waveguides (optical waveguides 101 in the mode coupling regions 101c) in these directional couplers. As a result, the transfer of light between the two optical waveguides does not take place only in the portion of the directional coupler formed of the two linear waveguides, but also partially takes place in these optical waveguides in S-shape in an actual multiplexer. That is to say, the directional coupler formed of the two linear waveguides shown herein is used to describe the operational principal, and thus, it is necessary to determine the structure by using a directional coupler into which optical waveguides in S-shape are effectively incorporated at the time of the manufacture of an actual multiplexer.

In addition, the mode coupling regions are described as linear waveguides here; however, they may be curved waveguides that are slightly different from a linear form, and thus may be any waveguide that allow mode coupling to take place between the two adjacent optical waveguides. Though the below-described mode coupling regions are all linear, they are not limited to being linear as described above.

Here, the directional coupler in the present embodiment is formed of optical waveguides for allowing basic mode light to propagate. Alternatively, the directional coupler in the present embodiment is formed of optical waveguides in a pseudo-basic mode where the basic mode light is more intense than the other higher mode light.

In the above-described optical waveguide-type multiplexer, as shown in the side diagrams where the multiplexers in FIGS. 1 and 2 are viewed in the left direction, optical waveguides having a core of which the cross-section is rectangular are mainly used (Patent Literature 1 and Patent Literature 2). However, a first problem arises such that the optical directional coupler formed of these optical waveguides of which the cross-section is rectangular allows the dimensions of the mode coupling in the multiplexing unit to vary greatly when the dispersion in the gap width becomes great due to the miniaturization of the gap between the optical waveguides, which causes a dispersion in the multiplexing properties of the waveguide-type optical multiplexer.

A second problem is that the multiplexing performance of the directional coupler is not high due to the poor efficiency in the mode coupling of the directional coupler itself as the multiplexing unit.

Therefore, the present inventors examined optical waveguides of which the cross-section of the core was asymmetric in the direction of the height as a substitute for the optical waveguides having the core of which the cross-section is rectangular, and as a result found that the above-described two problems could be solved. Thus, in the optical multiplexer according to the present embodiment, the shape of the cross-section of the cores of the S-shaped waveguides in the optical directional coupler and the optical waveguides in the mode coupling regions are made asymmetric in the direction of the height.

Figure 4:
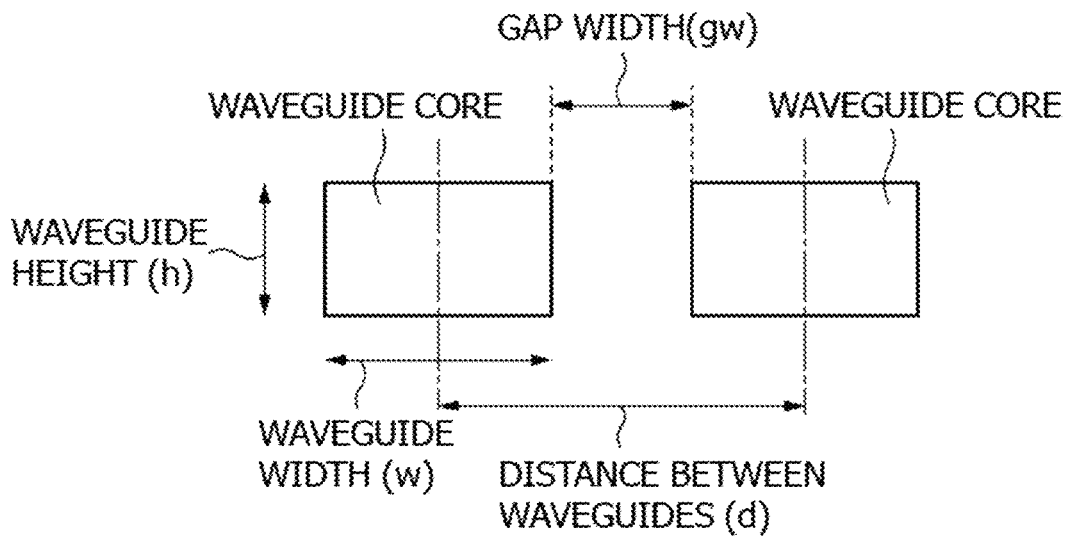
FIG. 4 is a diagram showing the shapes of the respective cross-sections of the pair of waveguides in a conventional optical multiplexing unit (directional coupler) and the pair of waveguides according to the present embodiment.
Figure 4:
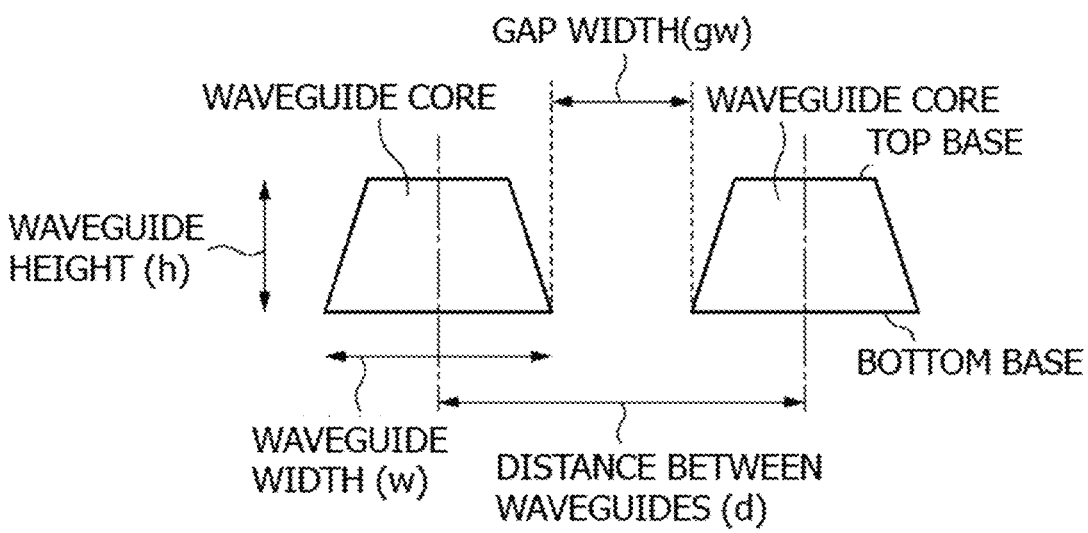

First, a case of optical waveguides of which the cross-sections are trapezoidal is described as an example of optical waveguides having a core of which the cross-section is asymmetric in the direction of the height. FIG. 4 is a diagram showing the shapes of the respective cross-sections of the pair of waveguides in a conventional optical multiplexing unit (directional coupler) and the pair of waveguides according to the present embodiment. These structures can be defined with the height of the waveguides (h), the width of the waveguides (w), the gap between the waveguides (d), and the gap width (gw), where in the case of a trapezoid, the gap width (gw) is defined as the gap width at the bottom base of the trapezoid. Here, the gap (d) between the waveguides is defined as the distance between the centers of the optical waveguides.

The efficiency in the mode coupling of the directional coupler itself as the multiplexing unit can usually be denoted as the coupling length. As described above, the coupling length represents the distance in the direction of the waveguides in a directional coupler through which light that is propagating through one optical waveguide transfers to the other optical waveguide. Accordingly, the mode coupling becomes small when the coupling length is long, whereas the mode coupling becomes large when the coupling length is short. The coupling length differs depending on the wavelength of light, and in general, blue light having a short wavelength provides the coupling length that is greater than that of red light having a long wavelength. This is caused by the fact that the length by which red light having a long wavelength exudes from the core of the field is greater than that of blue light having a short wavelength. In addition, the coupling length depends on the gap width between the optical waveguides in the pair of mode coupling regions in the directional coupler. The coupling length is short when the gap width is narrow, and the coupling length is long when the gap width is wide. Accordingly, the operations shown in FIG. 3 are determined by the ratio of the coupling length of blue (LB) to the coupling length of red (LR) (the value gained by dividing LB by LR, which is represented as B/R ratio (=LB/LR)). Furthermore, the ratio of the coupling lengths depends on the gap width between the pair of optical waveguides, and in addition depends on the wavelengths of the two light beams.

As a result of the examination, the inventors of the present application found that the ratio of the coupling lengths, in particular the B/R ratio, greatly depends on the shape of the cross-section of the waveguides in the case where the light beams are red and blue that have the largest difference in the wavelength from among any combinations of the three primary colors of light.

Figure 5:
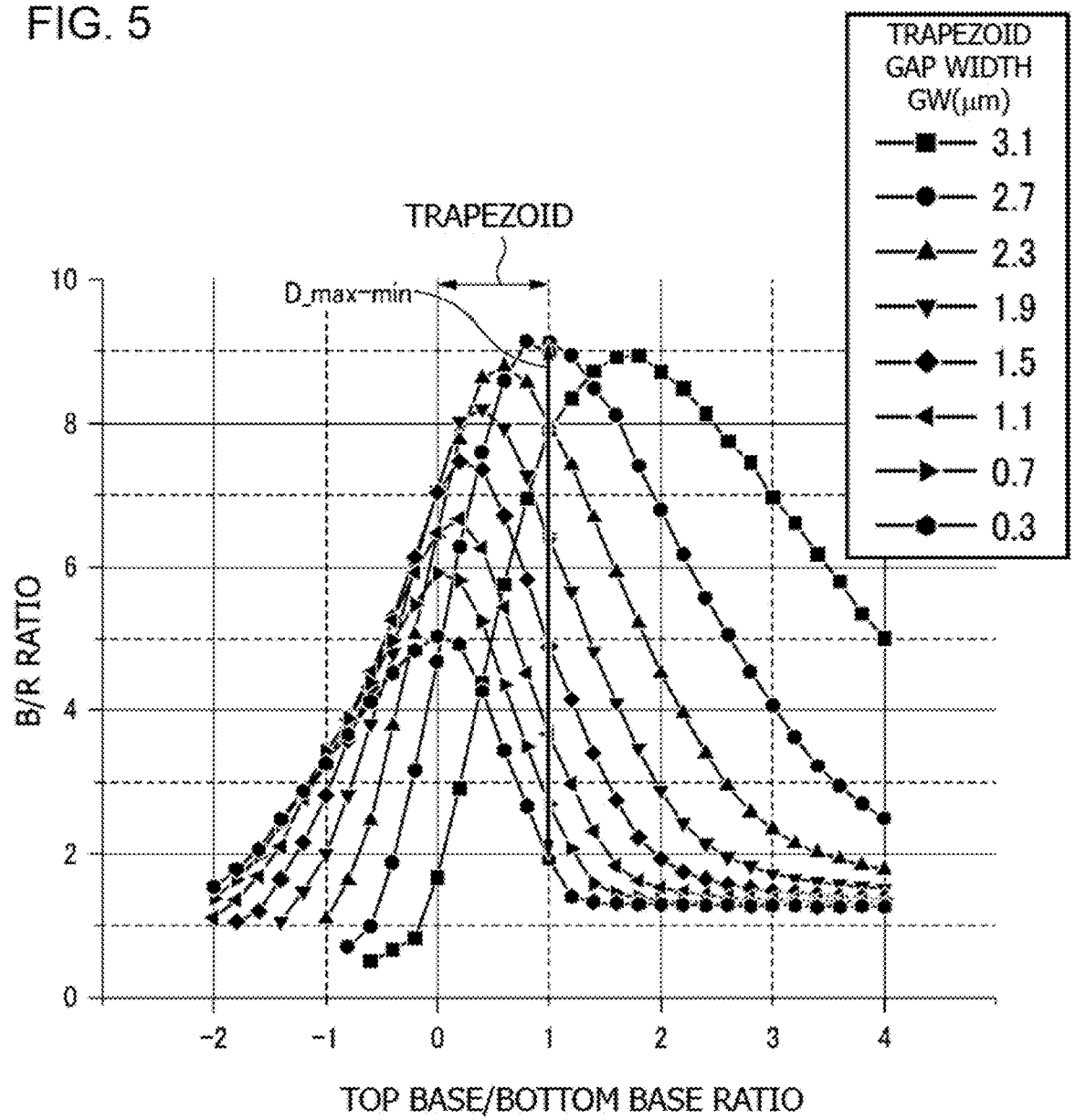
FIG. 5 is a graph showing the results of simulations of the relationship between the ratio of coupling lengths of blue and red (B/R ratio) and the ratio of the top base of the trapezoid to the bottom base (top base/bottom base ratio) in the cross-section.

FIG. 5 is a graph showing the results of simulations of the relationship between the ratio of coupling lengths of blue and red (B/R ratio) and the ratio of the top base of the trapezoid to the bottom base (top base/bottom base ratio) in the cross-section. In this case, the difference in the refractive index between the core and the clad is 0.8%, the height of the waveguides (h) is 1.6 μm, and the gap between the waveguides (d) is 4 μm. These values are representative values of the directional coupler which is the multiplexing unit of the multiplexer shown in Non-Patent Literature 1. Here, the difference in the refractive index between the core and the clad is defined as $(n_{core}-n_{clad})/n_{core} \times 100(\%)$ when the refractive index of the core is $n_{core}$ and the refractive index of the clad is $n_{clad}$. In addition, the gap width (gw) is varied from 3.1 to 0.3 μm as a parameter. Here, the gap between the waveguides (d) is fixed to 4 μm, and therefore, the width of the waveguides (w) varies from 0.9 to 3.7 μm.

Figure 6A:
FIGS. 6A and 6B are diagrams showing the relationships between the shapes and the top base/bottom base ratio of seven types of cross-sections of waveguides.
Figure 6A:
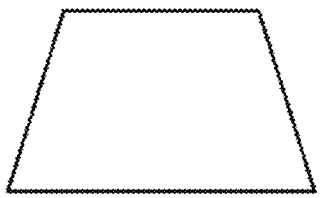
Figure 6A:
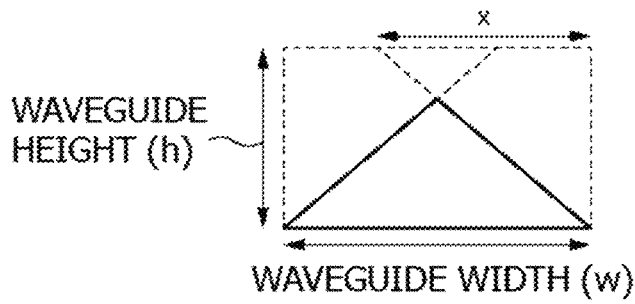
Figure 6A:
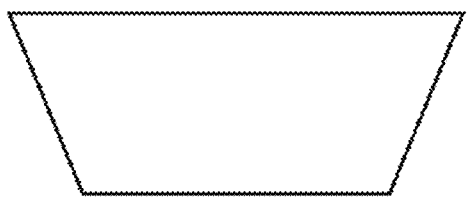
Figure 6B:
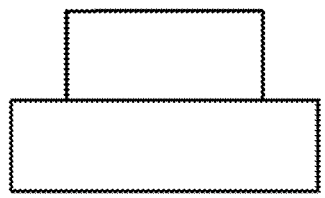
Figure 6B:
Figure 6B:
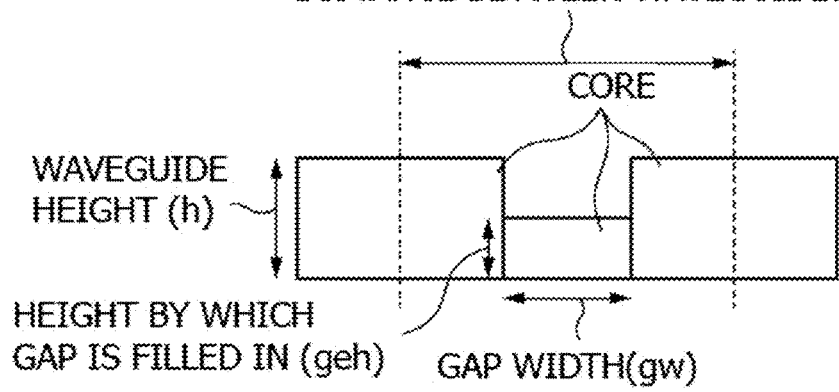

FIGS. 6A and 6B are diagrams showing the relationships between the shapes and the top base/bottom base ratio of seven types of cross-sections of waveguides. The case where the top base/bottom base ratio along the lateral axis is 1 in FIG. 5 corresponds to a rectangular cross-section (cross-section in (1) of FIG. 6A), the case where the top base/bottom base ratio is less than 1 and greater than 0 corresponds to a trapezoidal cross-section ((2) of FIG. 6A), the case where the top base/bottom base ratio is 0 or less corresponds to a triangular cross-section ((3) of FIG. 6A), and the case where the top base/bottom base ratio is greater than 1 corresponds to a reverse trapezoidal cross-section where the length of the top base is greater than the length of the bottom base ((4) of FIG. 6A).

Furthermore, (5) of FIG. 6B shows the cross-section of a two-tier core where a plurality of rectangular cores are stacked on each other, (6) of FIG. 6B shows a cross-section of a trapezoidal core of which one side is vertical, and (7) of FIG. 6B shows a cross-section where a gap between the waveguides is filled in with the core material, respectively. The cross-section in (7) of FIG. 6B has a gap-embedded height (geh) added as a parameter.

Moreover, in FIG. 5, the wavelength of red light is 0.633 μm and the wavelength of blue light is 0.448 μm; however, the wavelengths of both red light and blue light are not limited to these wavelengths in the embodiment of the present application, and the respective wavelengths may be in the regions of light where the colors are actually perceived to be blue and red. As for the concrete ranges of the respective wavelengths, red is approximately 0.6 to 0.8 μm and blue is approximately 0.4 to 0.5 μm.

Here, FIG. 5 shows the results of simulations in directional couplers made of two linear waveguides. In the case where waveguides in S-shape made of curves are connected to the directional coupler, the respective coupling lengths of red and blue light vary. In the case where optical waveguides in S-shape are connected to the waveguides in the directional coupler, however, the ratio of the coupling length between blue and red (B/R ratio) is confirmed to be approximately the same as in the case of a directional coupler made of two linear waveguides when the curvature radius of the waveguides in S-shape is that of practical optical waveguides in S-shape where there is no loss of light as a result of radiation to the outside due to this curve. This result is applied to all of the below-described cases without being limited to those in FIG. 5.

Optical Waveguide-Type Multiplexer According to First Embodiment where Amount of Fluctuation (Dispersion) in B/R Ratio is Reduced to Solve First Problem FIG. 5 shows the B/R ratio along the longitudinal axis in relation to the top base/bottom base ratio=(w−2x)/w along the lateral axis (see FIG. 6A(3)) in the respective cases that correspond to the eight gap widths. According to this graph, the B/R ratio has a peak for the top base/bottom base ratio of 0 to 1 in each case where the x value is varied so as to change the top base/bottom base ratio in such a manner that the position of the peak shifts correspondingly with the gap width. That is to say, FIG. 5 shows that the B/R ratio greatly depends on the top base/bottom base ratio as well as on the gap width.

In order to quantify from FIG. 5 the fluctuation of the B/R ratio that accompanies the change in the gap width, a graph is shown in such a manner that the lateral axis indicates the top base/bottom base ratio in the same manner as in FIG. 5, and the longitudinal axis indicates the difference between the maximum value and the minimum value of the B/R ratio for the gap width in the range of 3.1 to 0.3 μm.

Figure 7:
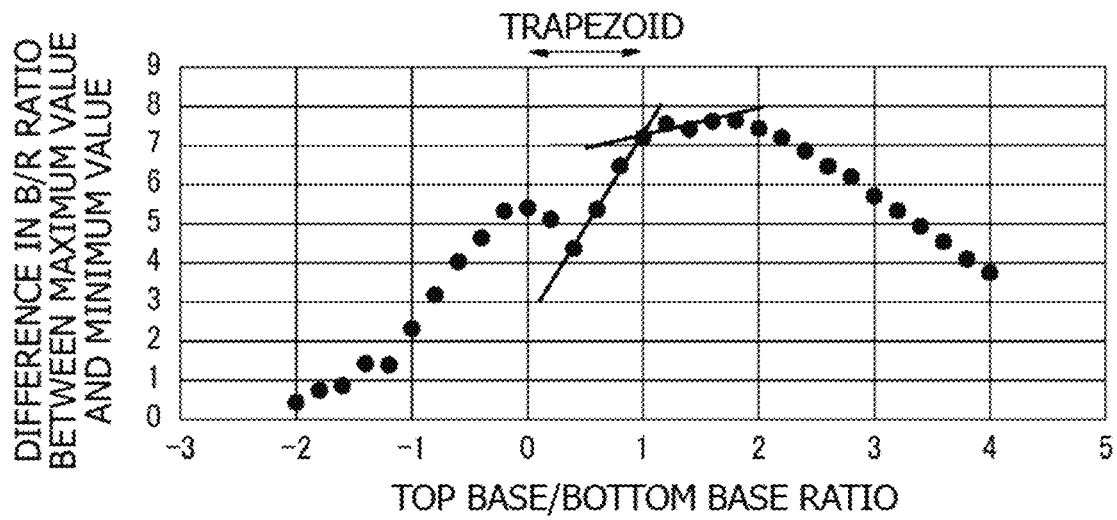
FIG. 7 is graphs where the lateral axis indicates the top base/bottom base ratio in the same manner as in FIG. 5, and the longitudinal axis indicates the difference between the maximum value and the minimum value (FIG. 7(1)) and the standard deviation (FIG. 7(2)), which are the fluctuation amounts in the B/R ratio that accompanies the change in the gap width gw in the range of 3.1 to 0.3 μm.
Figure 7:
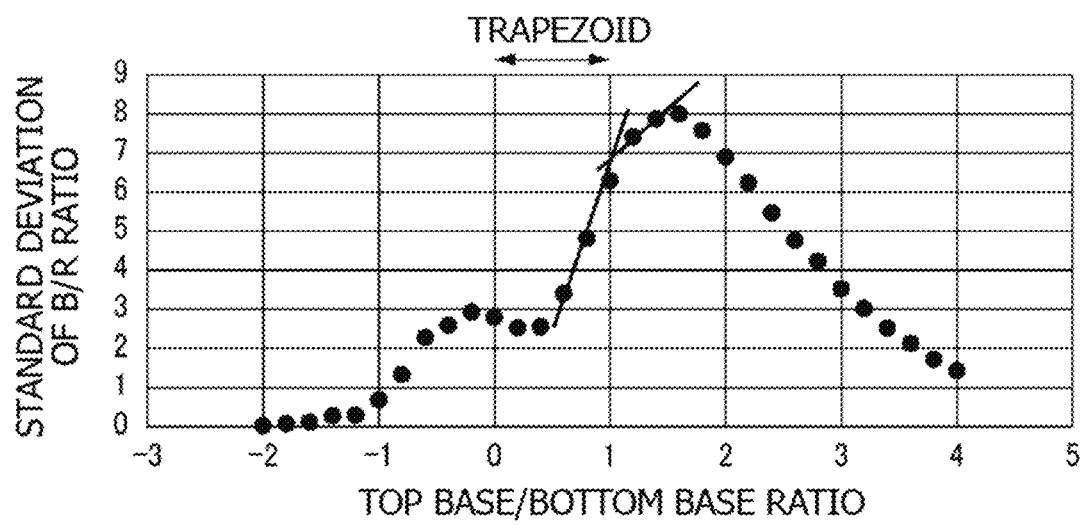

FIG. 7 is graphs where the lateral axis indicates the top base/bottom base ratio in the same manner as in FIG. 5, and the longitudinal axis indicates the difference between the maximum value and the minimum value ((1) of FIG. 7) and the standard deviation ((2) of FIG. 7), which are the fluctuation amounts in the B/R ratio that accompanies the change in the gap width gw in the range of 3.1 to 0.3 μm. FIG. 7 show examples where the distance between the waveguides w=4 μm. The range of the gap width gw from 3.1 to 0.3 μm covers the gap widths that are usually used, and the results in (1) of FIG. 7 can be regarded as the difference between the maximum value and the minimum value in general directional couplers that are commonly fabricated. FIG. 5 shows, as an example, the dimension $D_{max-min}$ of the difference between the maximum value and the minimum value in the case where the top base/bottom base ratio is 1. FIG. 7 show the following.

(1) At the point where the rectangular cross-section having the top base/bottom base ratio of 1 transits to a trapezoidal cross-section, the difference between the maximum value and the minimum value of the B/R ratio greatly changes, whereas at the point where a trapezoid having a top base/bottom base ratio of less than 1 and greater than 0 appears, the difference between the maximum value and the minimum value becomes dramatically smaller. Here, the lines in the figures are guidelines indicating this effect.

(2) For the entire range where the cross-section is trapezoidal (the top base/bottom base ratio is less than 1 and greater than 0), the difference between the maximum value and the minimum value of the B/R ratio in the trapezoid is greatly smaller as compared to the cases where the cross-section is rectangular (the top base/bottom base ratio is 1). This means that the range of fluctuation of the B/R ratio is small in trapezoids when the gap width fluctuates due to the fluctuation in the process. Here, in the case where the top base/bottom base ratio is 0 or smaller, the difference between the maximum value and the minimum value of the B/R ratio is small in the same manner as in the trapezoids, and this region is that of triangular cross-sections.

(3) The same effects that relate to the difference between the maximum value and the minimum value of the B/R ratio are gained as well in the case of the standard deviation of the B/R ratio that is gained by varying the gap widths in (2) of FIG. 7.

It can be seen from the above results that the amount of fluctuation of the B/R ratio due to the fluctuation of the gap width is smaller as compared to the case where the cross-section is rectangular when the top base/bottom base ratio is less than 1.

As described above, the amount of fluctuation of the B/R ratio corresponding to the fluctuation of the gap width in the case where the cross-section is a trapezoid with the top base/bottom base ratio of less than 1 is small as compared to the case where the cross-section is rectangular, even when a dispersion (fluctuation) is caused in the gap widths by the miniaturization of the gap between the waveguides. As a result of this, the dispersion in the multiplexing properties of the optical waveguide-type multiplexers can be reduced, which is important in the industry, by making the cross-section of the core of the waveguides in the optical directional coupler be trapezoidal. The transfers of light shown in (1), (2) and (3) of FIG. 3 during the operation are determined by the B/R ratio, and therefore, the dispersion of the gap width between the optical waveguides of a multiplexing unit during the manufacturing process causes only small amounts of fluctuation of the B/R ratio, which means a small amount of fluctuation in the operational properties of the multiplexing unit. In other words, the optical multiplexing unit has desired multiplexing properties in the case where the ratio of the coupling lengths, the B/R ratio, which depend on the gap width and the wavelength of light, have optimal values as targets. Accordingly, desired multiplexing properties can be easily gained with an increase in the yield in the case where the fluctuation of the B/R ratio is small relative to the dispersion of the gap width due to the dispersion in the manufacture.

It can be seen from the above that it is desirable for the top base/bottom base ratio in the cross-section of a pair of waveguides or of either waveguide in the multiplexing unit (optical directional coupler) according to the first embodiment to be less than 1, preferably 0.95 or less. In the case where the top base/bottom base ratio is 0.95 or less, the cross-section of the core of a waveguide has a significant shape that can be said to be trapezoidal, and thus can be substantially differentiated from a rectangular shape (the top base/bottom base ratio is 1+/−0.05) that causes the dispersion in the manufacture. In addition, it is desirable for the top base/bottom base ratio to be less than 1 (0.95 or less) and 0 or greater so that the shape of the cross-section is in such a range that the intensity of light that emits from the waveguide is not shifted much from the symmetric (circular) distribution (the range where the shape is trapezoidal in this case). Most preferably, it is desirable for the top base/bottom base ratio to be less than 1 (0.95 or less) and 0.5 or greater, and furthermore, it is desirable for the top base/bottom base ratio to be less than 1 (0.85 or less) and 0.5 or greater. In the case where the top base/bottom base ratio is less than 1 and 0.5 or greater, the distribution of the intensity of emission light remains in a shape that is close to being circular. In the case where it is not required for the intensity of emission light to have a symmetric (circular) distribution, the top base/bottom base ratio may be 0 or less. As shown in (3) of FIG. 6A, the shape having the top base/bottom base ratio of 0 or less means a triangle where the height of the core in the cross-section is lower than the height h of the wave guides.

The above-described properties concerning the top base/bottom base ratio of the cross-section of the waveguides are also confirmed for the structural parameters in the below-described other directional couplers that are conventionally used without being limited to the structural parameters of the representative directional couplers shown in FIGS. 5 and 7, and thus provide universal effects that can be established in conventionally used multiplexers. For example, a ridge-type waveguide, where the core layer in the waveguide has a ridge shape, also has similar properties in terms of the B/R ratio relative to the top base/bottom base ratio in addition to the structure where a waveguide in an optical directional coupler has a core layer that is surrounded by a clad layer.

Concerning Cross-Section of Core Having Asymmetric Shape in Direction of Height

The shapes that are asymmetric in the direction of the height in the cross-section of the core of a pair of waveguides in the optical directional coupler according to the first embodiment include trapezoids, triangles, reverse trapezoids, two-tier shapes, trapezoids with one side being perpendicular, gap-embedded shapes where the gap between rectangular waveguides is partially filled in with the core material, and the like as shown in FIGS. 6A and 6B.

Core Cross-Section in Trapezoidal Shape or Pseudo-Trapezoidal Shape

As already described in reference to FIGS. 5 and 7, the dispersion in the B/R ratio due to the dispersion in the manufacturing process is small in the case where the core cross-section is trapezoidal. Trapezoidal shapes of the core cross-section include pseudo-trapezoidal shapes.

In the case where the sidewalls of the core are not linear but made of a curve that is slightly different from a linear shape in the cross-section, for example, when the shape is a pseudo-trapezoid, which can be approximately regarded as a trapezoid, and, the properties of the trapezoid are approximately the same as the properties of such a pseudo-trapezoidal shape, then the pseudo-trapezoid can be regarded as a trapezoidal shape.

In the case where the top base and the bottom base in the core cross-section are not linear but are loose curves, when the shape is a pseudo-trapezoid that can approximately be regarded as a trapezoid, and, the properties of the trapezoid are approximately the same as the properties of this pseudo-trapezoid, this pseudo-trapezoid can be regarded as a trapezoidal shape. Furthermore, the shape having the angles of a trapezoid between the top base and the lateral sides being round and the shape having the outer angle between the bottom base and the lateral sides being round are also a pseudo-trapezoid.

Here, a case where the core cross-section is in a trapezoidal shape is described; however, the same can be applied to the cases where the cross-section of waveguides has any of the below-described shapes in addition to the trapezoidal shape (two-tier core shape in (5) of FIG. 6B, the trapezoidal shape with one lateral side being vertical and the other being diagonal in (6) of FIG. 6B, and the gap-embedded shape where the gap between waveguides is filled in (7) of FIG. 6B. That is to say, in the case where the top base, the bottom base, or a sidewall is made of a curve that is slightly different from a linear shape in any of these shapes, these shapes can be approximately regarded as the corresponding cross-sectional shape where the top base, the bottom base, and the sidewalls are made of lines. In addition, in the case where the properties of the cross-sectional shape made of the corresponding lines are approximately the same as the properties of the shapes including a curve that is slightly different from a linear shape, the shapes where any of the top base, the bottom base, and the sidewalls is made of a curve that is slightly different from a linear shape can be regarded as the corresponding cross-sectional shape that is made solely of lines.

Figure 17:
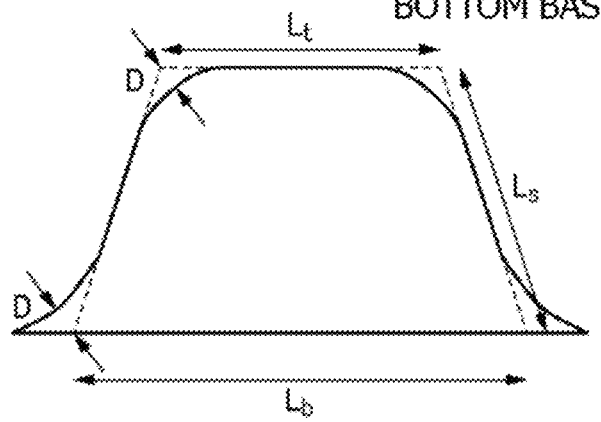
FIG. 17 is a diagram showing examples of three types of pseudo-trapezoidal shapes of the core cross-section of waveguides in an optical directional coupler.
Figure 17:
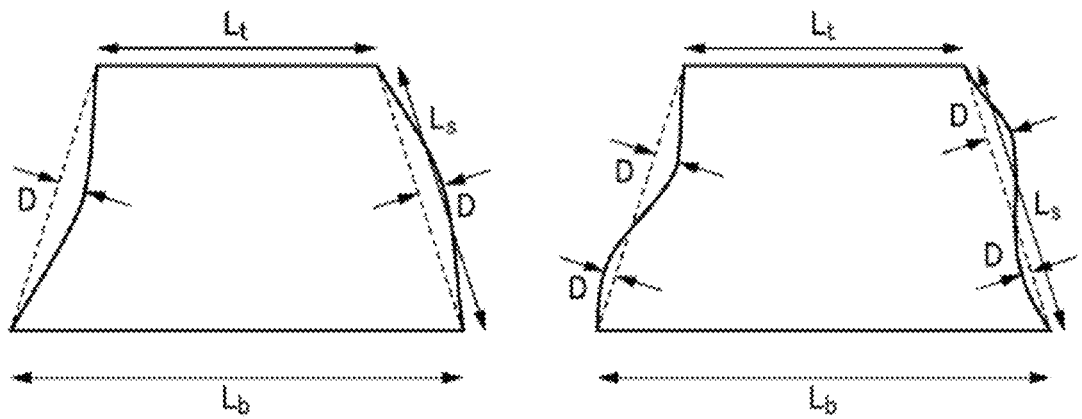
Figure 17:
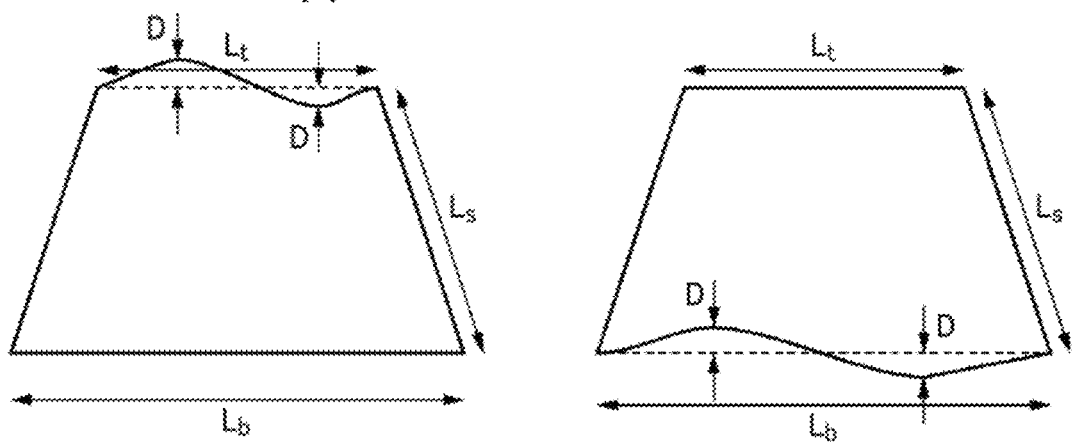

FIG. 17 is a diagram showing examples of three types of pseudo-trapezoidal shapes of the core cross-section of waveguides in an optical directional coupler. FIG. 17(1) shows an example where the corners are round in a pseudo-trapezoid, FIG. 17(2) shows an example where the sidewalls are slightly curved in a pseudo-trapezoid, and FIG. 17(3) shows an example where the top base or the bottom base is curved in a pseudo-trapezoid.

In the example with rounded corners in FIG. 17(1), the corner between the top base Lt and a lateral side Ls in the trapezoid has been shaved, where the distance between the corner of an ideal trapezoid and the corner in the actual shape is indicated as the amount of roundness D. In addition, the outer corner between the bottom base Lb and a lateral side Ls in the trapezoid is filled in, where the distance between the outer corner of the ideal trapezoid and the corner in the actual shape is indicated as the amount of roundness D. The range of the amount of roundness D that makes the shape be regarded as a pseudo-trapezoid is as follows, for example.

$$D<\mathrm{MAX}(Lt,Ls,Lb)*0.2$$

That is to say, the trapezoid can be regarded as a pseudo-trapezoid in the case where the amount of roundness of the corner D is less than 20% of the longest length from among the top base Lt, the bottom base Lb, and the lateral side Ls that are adjacent to the corner. In the present embodiment, the shape is regarded as a pseudo-trapezoid even when the corner is rounded to this degree due to the dispersion in the manufacturing process.

In the example with curved sides in FIG. 17(2), the sidewalls of the trapezoid are curves where the distance between a sidewall and that of an ideal trapezoid is indicated as the amount of curvature D of the sidewalls. The range of the amount of curvature D that makes the shape be regarded as a pseudo-trapezoid is as follows, for example.

$$\mathrm{MAX}(D)<Ls*0.2$$

That is to say, the trapezoid can be regarded as a pseudo-trapezoid in the case where the maximum value of the curvature D of the sidewalls is less than 20% of the length Ls of the sidewalls. In the present embodiment, the shape is regarded as a pseudo-trapezoid even when the sidewalls are curved to this degree due to the dispersion in the manufacturing process.

In the example with a curved top base or curved bottom base in FIG. 17(3), the top base or the bottom base of a trapezoid is curved, and the distance between the top base or the bottom base of the trapezoid and that in an ideal trapezoid is indicated as the amount of curvature D of the top base or the bottom base. The range of the amount of curvature D of the top base or the bottom base that makes the shape be regarded as a pseudo-trapezoid is as follows, for example.

$$\mathrm{MAX}(D)<(Lt \text{ or } Lb)*0.2$$

That is to say, the trapezoid can be regarded as a pseudo-trapezoid in the case where the maximum value of the curvature D of the top base or the bottom base is less than 20% of the length Lt or Lb of the top base or the bottom base. In the present embodiment, the shape is regarded as a pseudo-trapezoid even when the top base or the bottom base is curved to this degree due to the dispersion in the manufacturing process.

Another Example (1) of Trapezoid

Figure 8:
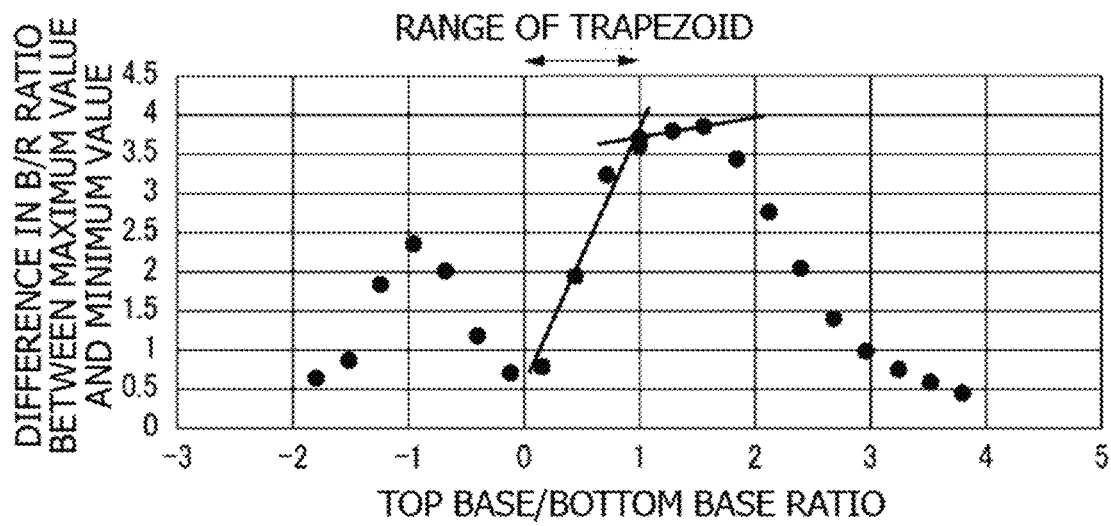
FIG. 8 is graphs that correspond to FIG. 7 for an optical directional coupler where the difference in the refractive index between the core and the clad, the distance between the waveguides and the range of the gap width are different.
Figure 8:
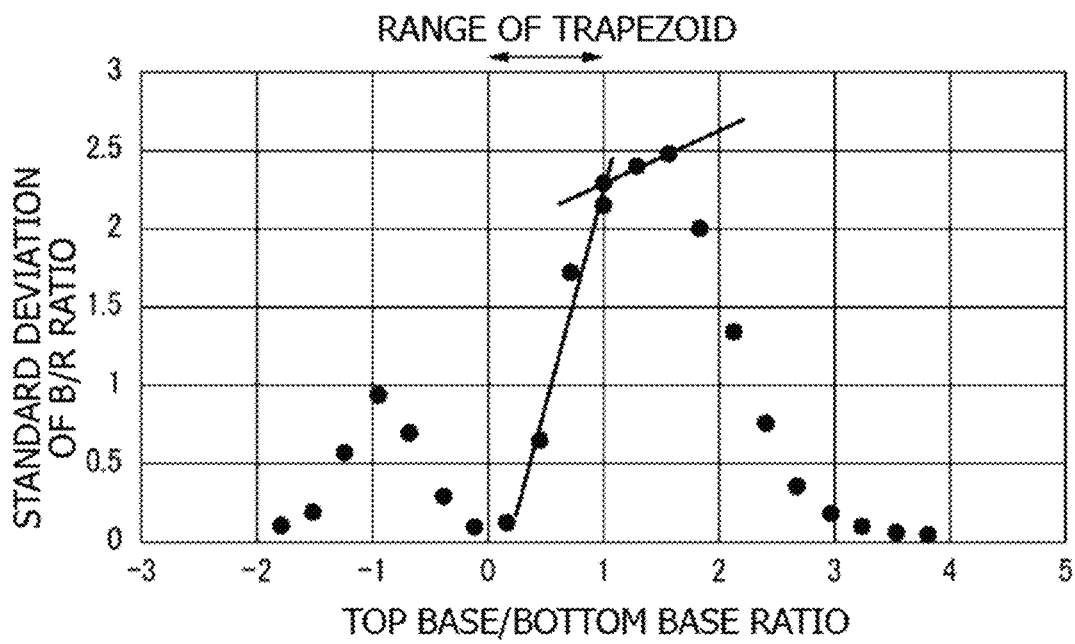

FIG. 8 is graphs that correspond to FIG. 7 for an optical directional coupler where the difference in the refractive index between the core and the clad, the distance between the waveguides and the range of the gap width are different. FIG. 8 relate to the case where though the height of the waveguides (h) is 1.6 µm, which is the same as in the cases of FIGS. 5 and 7, the difference in the refractive index between the core and the clad is 1.1%, and the distance between the waveguides (d) is 3.4 µm. In addition, the gap width is varied in a range from 1.2 µm to 2 µm. (1) of FIG. 8 shows the relationship between the difference in the B/R ratio between the maximum value and the minimum value and the top base/bottom base ratio, and (2) of FIG. 8 shows the relationship between the difference in the standard deviation of the B/R ratio and the top base/bottom base ratio. In this case as well, the three results (1), (2), and (3) that are the same as those described in relation to FIG. 7 are obtained.

Another Example (2) of Trapezoid

Figure 9:
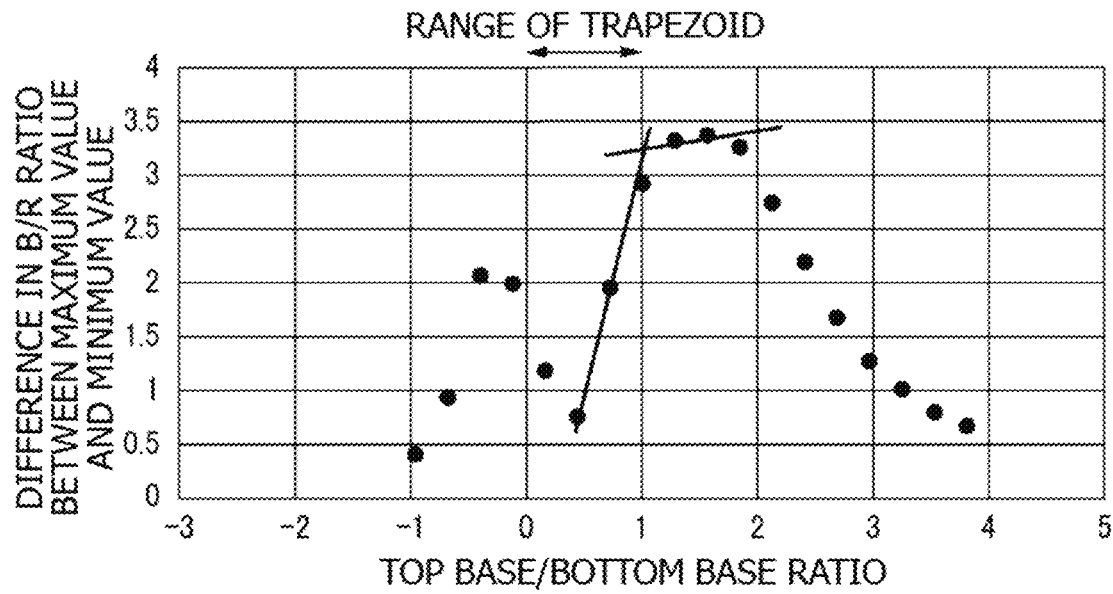
FIG. 9 is graphs that correspond to FIG. 7 for an optical directional coupler where the height of the waveguides and the range of the gap width are different.
Figure 9:
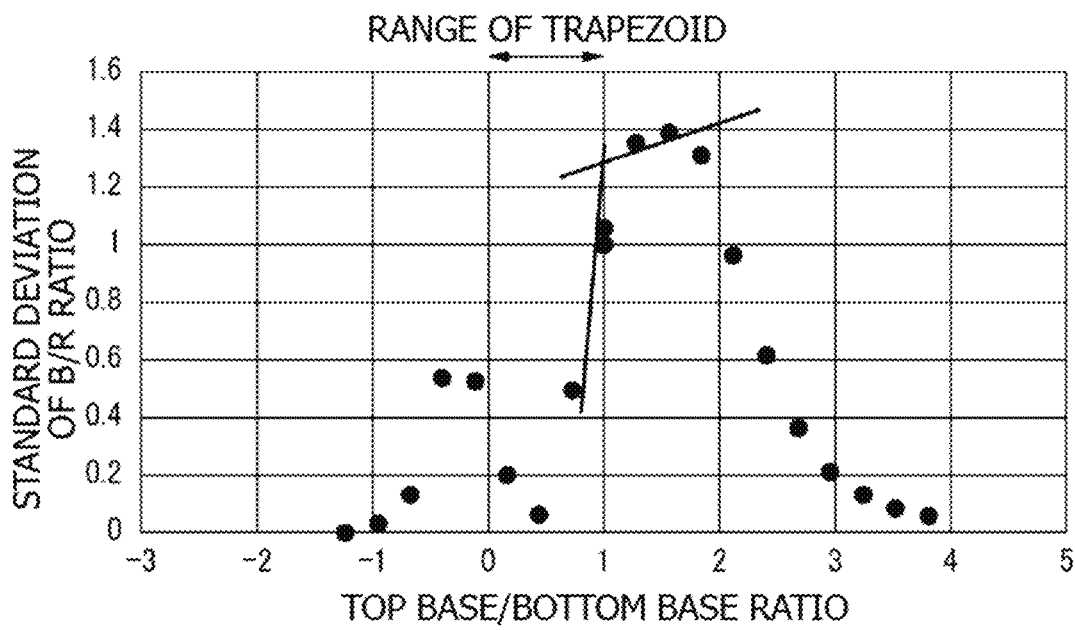

FIG. 9 is graphs that correspond to FIG. 7 for an optical directional coupler where the height of the waveguides and the range of the gap width are different. FIG. 9 relate to the case where though the difference in the refractive index between the core and the clad is 0.8% and the distance between the waveguides (d) is 4 μm, which are the same as in the cases of FIGS. 5 and 7, the height of the waveguides (h) is 1.2 μm. In addition, the gap width is varied in a range from 1.5 μm to 2.4 μm. (1) of FIG. 9 shows the relationship between the difference in the B/R ratio between the maximum value and the minimum value and the top base/bottom base ratio, and (2) of FIG. 9 shows the relationship between the difference in the standard deviation of the B/R ratio and the top base/bottom base ratio. In this case as well, the three results (1), (2), and (3) that are the same as those described in relation to FIG. 7 are obtained.

As shown in the above-described directional couplers of three examples in FIGS. 7, 8, and 9:

Example (1) where the difference in the refractive index between the core and the clad is 0.8%, the height of the waveguides (h) is 1.6 μm, and the distance between the waveguides (d) is 4 μm;

Example (2) where the difference in the refractive index between the core and the clad is 1.1%, the height of the waveguides (h) is 1.6 μm, and the distance between the waveguides (d) is 3.4 μm; and Example (3) where the difference in the refractive index between the core and the clad is 0.8%, the height of the waveguides (h) is 1.2 μm, and the distance between the waveguides (d) is 4 μm; the three results (1), (2), and (3) that are described in relation to FIG. 7 are shown to be achieved for these directional couplers in the three examples. These three examples are representative examples of directional couplers that are conventionally used for a three primary color multiplexer, and therefore, the three results (1), (2), and (3) that are described in relation to FIG. 7 can be said to be generally achieved for a ordinally-used directional coupler. Here, the ordinally-used directional coupler is that of a case where the difference in the refractive index between the core and the clad is 5% or less, the distance between the waveguides (d) is 15 μm or less, the height of the waveguides (h) is 10 μm or less, and the main mode for light that propagates through the waveguides is the basic mode.

Example of Two-Tiered Core Cross-Section

The same results are gained for directional couplers where waveguides having such a core cross-section that two rectangles with different widths are layered on top of each other (two-tiered core cross-section) are used as shown in FIG. 6B(5).

Figure 10:
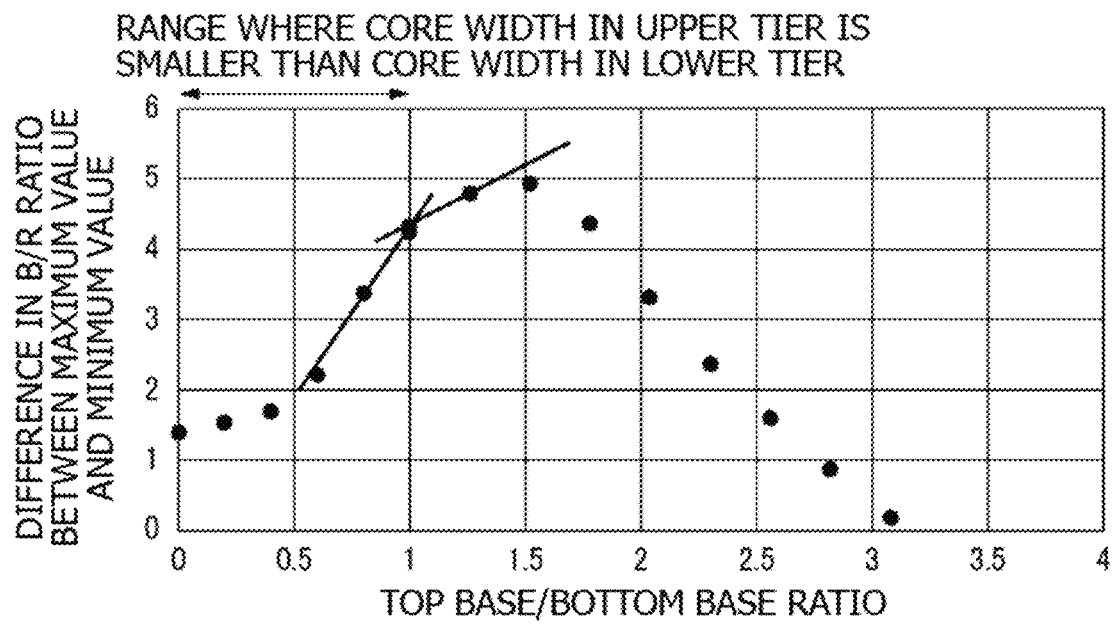
FIG. 10 depicts graphs that correspond to FIG. 7 for an optical directional coupler whose core cross-section is a shape that two rectangles having different widths are layered.
Figure 10:
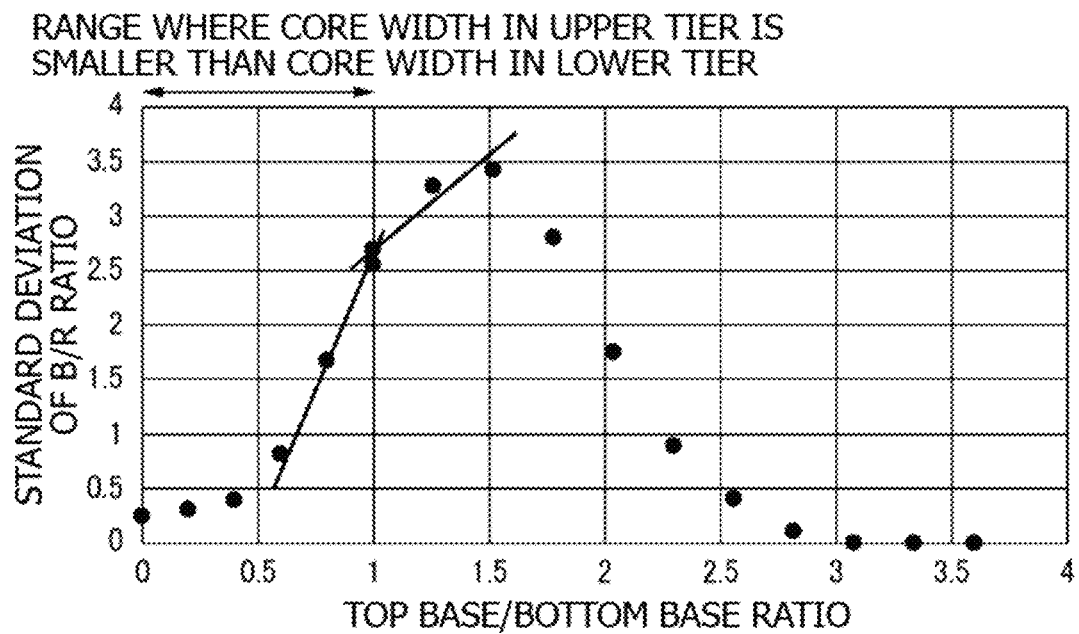

FIG. 10 is graphs that correspond to FIG. 7 for an optical directional coupler whose core cross-section is a shape that two rectangles having different widths are layered. In this case, the width of the core in the upper tier is smaller than the width of the core in the lower tier, and the height of the core in the upper tier is the same as that in the lower tier in the waveguides. In addition, the difference in the refractive index between the core and the clad is 0.8%, the height of the waveguides (h) is 1.6 μm (the total of the heights of the core in the upper tier and the core in the lower tier), the distance between the waveguides (d) is 4 μm, and the gap width (gap width between the cores in the lower tier) is varied in a range from 1.5 μm to 2.7 μm. (1) of FIG. 10 shows the relationship between the difference in the B/R ratio between the maximum value and the minimum value and the top base/bottom base ratio, and (2) of FIG. 10 shows the relationship between the standard deviation of the B/R ratio and the top base/bottom base ratio. Here, the top base/bottom base ratio is a ratio of the width of the core in the upper tier to the width of the core in the lower tier. FIG. 10 shows the following.

(1a) At the point where the top base/bottom base ratio is 1, that is to say, the cross-section changes from a rectangle to a two-tiered core, the difference in the B/R ratio between the maximum value and the minimum value changes greatly, and the difference between the maximum value and the minimum value dramatically becomes small as the cross-section becomes that of a two-tiered core. Here, the lines in the graph are guidelines that indicate this effect.

(2a) The difference in the B/R ratio between the maximum value and the minimum value in the cross-section of a two-tiered core becomes greatly smaller as compared to the case of a rectangle (the top base/bottom base ratio is 1) for the entire range of the cross-section of a two-tiered core (the top base/bottom base ratio is less than 1 but not less than 0).

(3a) The same effects for varying the difference in the B/R ratio between the maximum value and the minimum value can be gained as shown in (2) of FIG. 10 in the case of the standard deviation of the B/R ratio that is gained by varying the gap width.

The modifications of the two-tiered core cross-section are as follows. In the above, waveguides having such a shape that two rectangles with different widths are layered each other in the core cross-section are illustrated. However, the above-described results (1a), 2(a), and 3(a) are gained as well in the case where the cross-section of the core of the waveguides has such a shape that two or more rectangles with different widths are layered each other, and the width becomes smaller as the level goes higher. Here, it should be noted that "the width becomes smaller as the level goes higher" means that the width of the core in the majority tiers from among a great number of tiers becomes smaller as the level goes higher, and does not mean that the width of the cross-section of the multitiered cores monotonously becomes smaller from the lower tier to the upper tier. The extreme case where the number of tiers becomes greater in the cross-section of the multitiered core as described above corresponds to a trapezoid.

In the case where the sidewalls of a trapezoidal cross-section are not in linear form but are made of curves that are slightly different from a linear shape, the case can be considered as an extreme example where the number of tiers of the multitiered core becomes greater in the cross-section, and thus, it is natural for the trapezoids made of curves that are slightly different from a linear shape exhibit the same results as the above (1a), 2(a), and 3(a). Here, it is not necessary for the respective heights of the multitiered cores to have the same values.

Example where Cross-Section is a Trapezoid Having One Lateral Side being Vertical and the Other being Diagonal The same results are gained for a directional coupler using waveguides that have such a cross-section that one lateral side of a trapezoid is vertical and the other is diagonal as shown in (6) of FIG. 6B.

Figure 11:
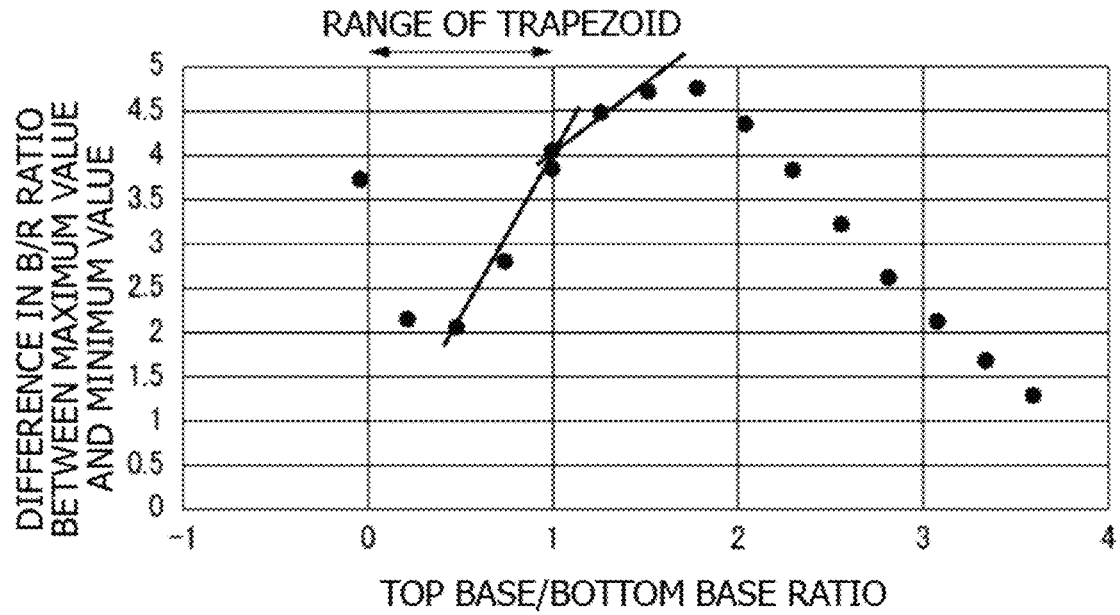
FIG. 11 depicts graphs that correspond to FIG. 7 for an optical directional coupler where the core cross-section is a trapezoid having one lateral side being vertical and the other being diagonal.
Figure 11:
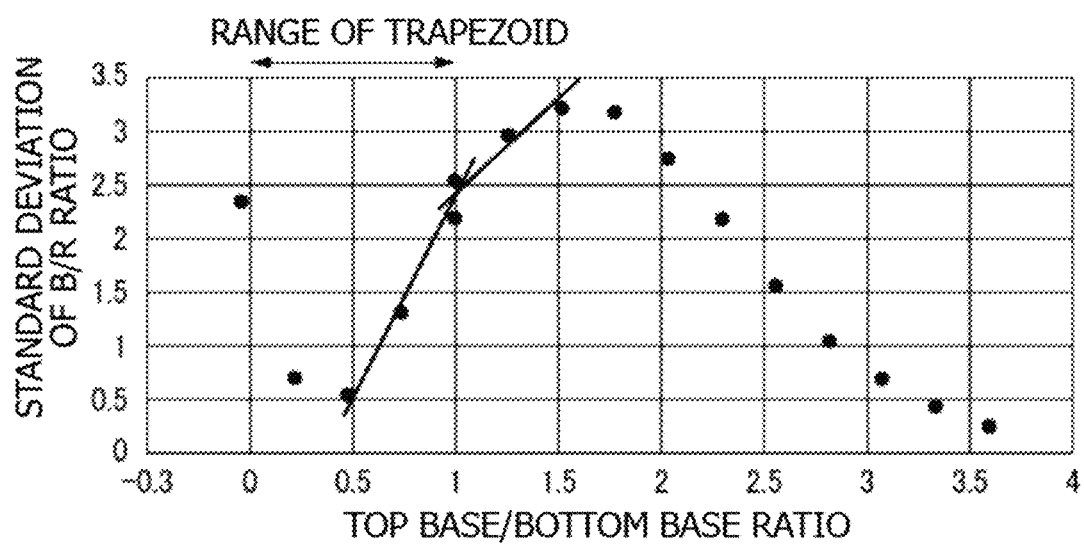

FIG. 11 is graphs that correspond to FIG. 7 for an optical directional coupler where the core cross-section is a trapezoid having one lateral side being vertical and the other being diagonal. In this case, the difference in the refractive index between the core and the clad is 0.8%, the height of the waveguides (h) is 1.6 μm, the distance between the waveguides (d) is 4 μm, and the gap width is varied in a range from 1.6 μm to 2.8 μm. (1) of FIG. 11 is a graph showing the relationship between the difference in the B/R ratio between the maximum value and the minimum value and the top base/bottom base ratio, and (2) of FIG. 11 is a graph showing the relationship between the standard deviation of the B/R ratio and the top base/bottom base ratio. FIG. 11 shows the following.

(1b) At the point where the top base/bottom base ratio is 1, that is to say, the cross-section changes from a rectangle to a trapezoid, the difference in the B/R ratio between the maximum value and the minimum value changes greatly, and the difference between the maximum value and the minimum value dramatically becomes small as the cross-section becomes that of a trapezoid. Here, the lines in the graph are guidelines that indicate this effect.

(2b) The difference in the B/R ratio between the maximum value and the minimum value in the cross-section of a trapezoid becomes greatly smaller as compared to the case of a rectangle for the entire range of trapezoids (the top base/bottom base ratio is less than 1 but not less than 0).

(2c) The same effects for varying the difference in the B/R ratio between the maximum value and the minimum value can be gained as shown in (2) of FIG. 11 in the case of the standard deviation of the B/R ratio that is gained by varying the gap width. These results are gained in the same manner in either case where the diagonal lateral side of the trapezoid is on the side of the core of the adjacent waveguide or on the other side.

Example of a Case where Gap Between Waveguides is Filled in

The same results are gained for a directional coupler where the gap between the waveguides is partially filled in as shown in (7) of FIG. 6B.

Figure 12A:
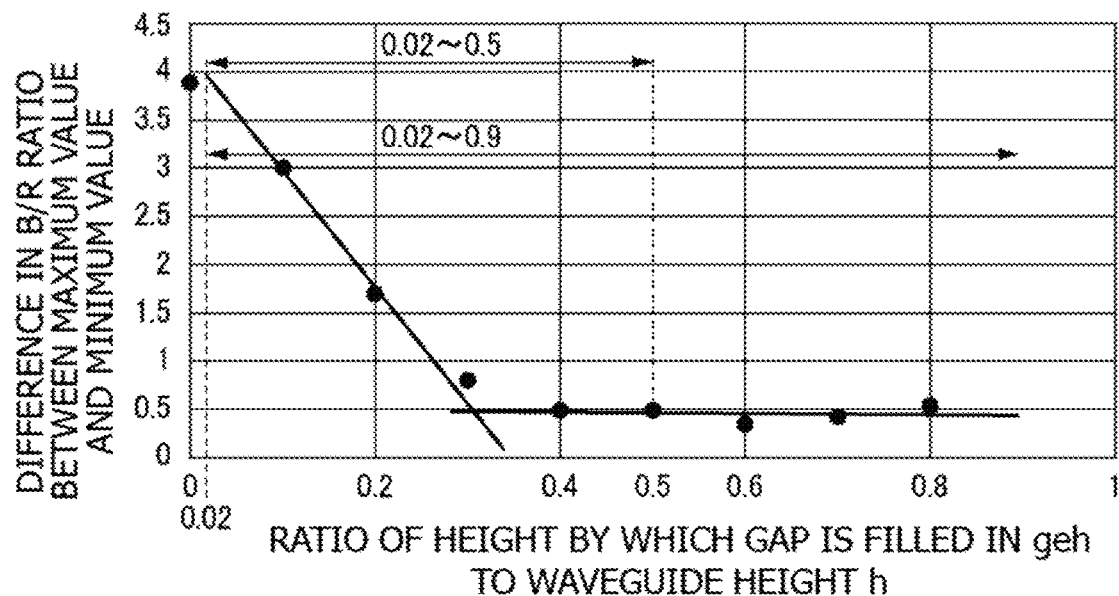
FIGS. 12A and 12B are graphs showing the variation of the B/R ratio relative to the ratio of the height by which the gap is filled in to the height of the waveguides of an optical directional coupler in such a shape that the gap between the waveguides is partially filled in in the core cross-section.
Figure 12A:
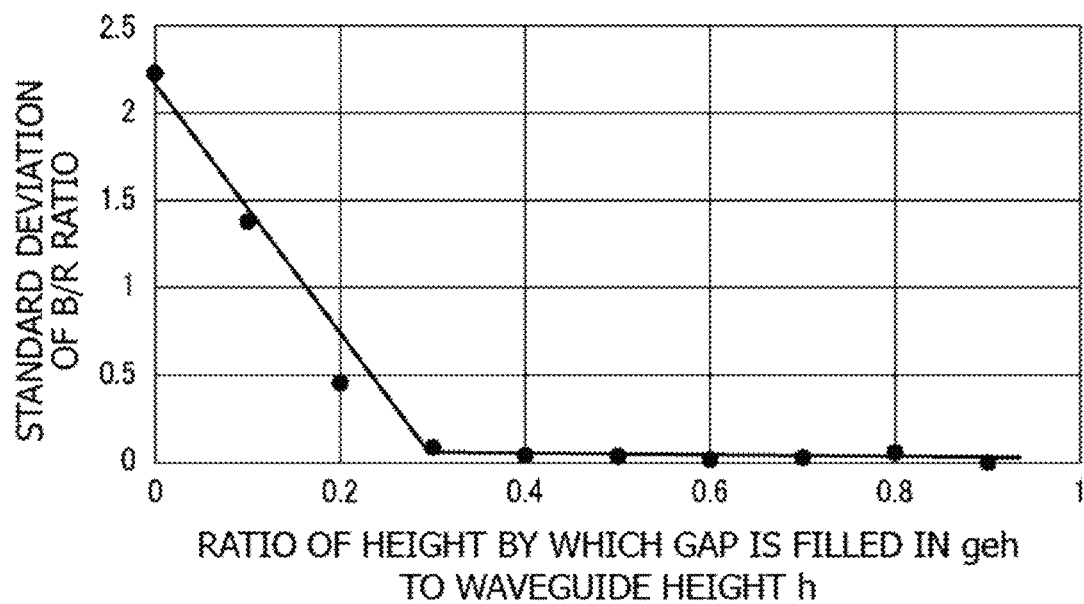
Figure 12B:
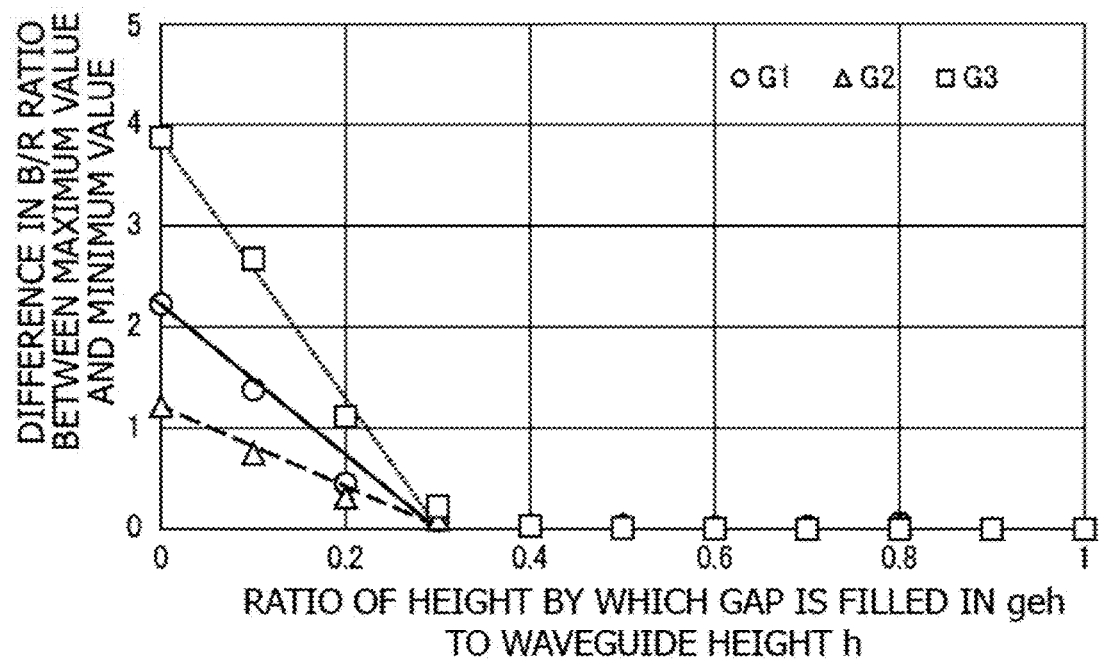

FIGS. 12A and 12B are graphs showing the variation of the B/R ratio relative to the ratio of the height by which the gap is filled in to the height of the waveguides of an optical directional coupler in such a shape that the gap between the waveguides is partially filled in in the core cross-section. In this case, the difference in the refractive index between the core and the clad is 0.8%, the height of the waveguides (h) is 1.6 μm, the distance between the waveguides (d) is 4 μm, and the gap width varies in a range from 1.6 μm to 2.8 μm. As the results of examination, it has been shown that the B/R ratio greatly depends on the ratio geh of the height by which the gap is filled in to the height of the waveguides h, and also greatly depends on the gap width gw. Therefore, (1) of FIG. 12A is gained by plotting along the lateral axis indicating the ratio of the height by which the gap is filled in to the height of the waveguides and the longitudinal axis indicating the difference in the B/R ratio between the maximum value and the minimum value in a range of the gap width from 1.6 μm to 2.8 μm in order to quantify the fluctuation in the B/R ratio that accompanies the change in the gap width. (1) of FIG. 12A shows the following.

(4) The difference in the B/R ratio in the maximum value and the minimum value is smaller in the case where the gap is filled in than in the case where the gap is not filled in. In addition, the difference in the B/R ratio between the maximum value and the minimum value is monotonously reduced until the ratio of the height by which the gap is filled in to the height of the waveguides becomes 0.3 from 0, and the difference in the B/R ratio between the maximum value and the minimum value is small and becomes almost constant when the ratio is 0.3 or greater.

(5) The same effects as for the difference in the B/R ratio between the maximum value and the minimum value can also be gained in the case of a standard deviation of the B/R ratio that is gained by varying the gap width as shown in (2) of FIG. 12A.

It can be seen from the above results that the difference in the B/R ratio between the maximum value and the minimum value is monotonously reduced in terms of the dimension of fluctuation in the B/R ratio due to the fluctuation in the gap width in an optical directional coupler in such a shape that the gap between the waveguides is partially filled in in the core cross-section and becomes small and approximately constant when the ratio of the height by which the gap is filled in to the height of the waveguides is 0.3 or greater.

Judging from FIGS. 12A(1) and 12A(2) and the below-described FIG. 12B(3), it is preferable for the ratio geh/h of the height geh by which the gap is filled in to the height h of the waveguides in the core cross-section to be in a range from 0.02 to 0.5 that is significantly different from the case where the height by which the gap is filled in is 0. The case where the ratio geh/h is 0.02 or greater is significantly different from the case where the height by which the gap is filled in is 0, and the fluctuation width of the B/R ratio becomes significantly narrow. 0.02 is the value of the ratio geh/h that corresponds to 3.8 that is approximately 90% of the difference 4.2 in the B/R ratio between the maximum value and the minimum value. In the case where the ratio geh/h is 0.5 or less, approximately 100% of the light that propagates through one waveguide can transfer to the other waveguide in an optical directional coupler. When the ratio exceeds this upper limit value, the ratio of light that is transferred becomes low.

Alternatively, it is preferable for the ratio geh/h to be in a range from 0.02 to 0.9, which is significantly different from the case where the height by which the gap is filled in is 0. The case where the ratio geh/h is 0.02 or greater is described above. In the case where the ratio geh/h is 0.9 or less, light that propagates through one waveguide can transfer to the other waveguide. In the case where the ratio exceeds this upper limit value, the gap is filled in by too much, which is substantially equivalent for the two waveguides to be combined and prevents light from transferring.

The above-described results (4) and (5) are also gained for directional couplers having representative structures other than those shown herein. FIG. 12B shows the relationship between the standard deviation of the B/R ratio in such structures and the ratio of the height by which the gap is filled in to the height of the waveguides. In the graph, G1 indicates the case of the above-described structure (the difference in the refractive index between the core and the clad is 0.8%, the height of the waveguides (h) is 1.6 μm, and the distance between the waveguides (d) is 4 μm), G2 indicates the case where the difference in the refractive index between the core and the clad is 0.8%, the height of the waveguide (h) is 1.2 µm, and the distance between the waveguides (d) is 4 µm, and G3 indicates the case where the difference in the refractive index between the core and the clad is 1.1%, the height of the waveguide (h) is 1.6 µm, and the distance between the waveguides (d) is 3.4 µm.

In all of the cases, as indicated by guidelines, the trend of the standard deviation of the B/R ratio changes through the border where the ratio of the height by which the gap is filled in to the height of the waveguides is 0.3. The difference in the standard deviation of the B/R ratio is monotonously reduced until the ratio of the height by which the gap is filled in to the height of the waveguides becomes 0.3 from 0, and the difference in the standard deviation of the B/R ratio is small and almost constant when the ratio is 0.3 or greater. This result for the standard deviation provides the same trend for the difference between the maximum value and the minimum value, and thus, it can be seen that the results shown in the above (4) and (5) are not achieved only for the special structures of the directional couplers, but also for general directional couplers as common properties.

Here, the present example where the gap between the waveguides is filled in with a core material is structurally categorized the same as the case of the above-described two-tiered core cross-section. That is to say, the present example corresponds to a case where the core portions in the lower tiers of the two-tiered cores are connected between the two waveguides.

The three examples shown in the above (the example of a two-tiered core cross-section, the example where the cross-section is a trapezoid having one lateral side being vertical and the other being diagonal, and the example of a case where the gap between the waveguides is filled in) are representative examples of optical waveguides having a core cross-section that is asymmetrical in the height direction including common trapezoids. Thus, it can be seen that even in the case where these optical waveguides have a dispersion (fluctuation) in the gap width that accompanies the miniaturization of the gap, they have such a superiority that the fluctuation in the B/R ratio becomes small as compared to those having a rectangular cross-section. It is also important to note that when two or more types of the above-described structures having a superiority as compared to those with a rectangular cross-section are combined, the properties that are superior to those with a rectangular cross-section can naturally be retained. In the case of a directional coupler made of waveguides having a trapezoidal cross-section where the gap between the waveguides is filled in with a core material, for example, the properties that are superior to the case of waveguides with a rectangular cross-section can be retained. In this manner, the use of an optical waveguide having a core cross-section that is asymmetric in the height direction essentially makes the dimensions of the fluctuation in the B/R ratio smaller as compared to that with a rectangular cross-section.

Figure 13:
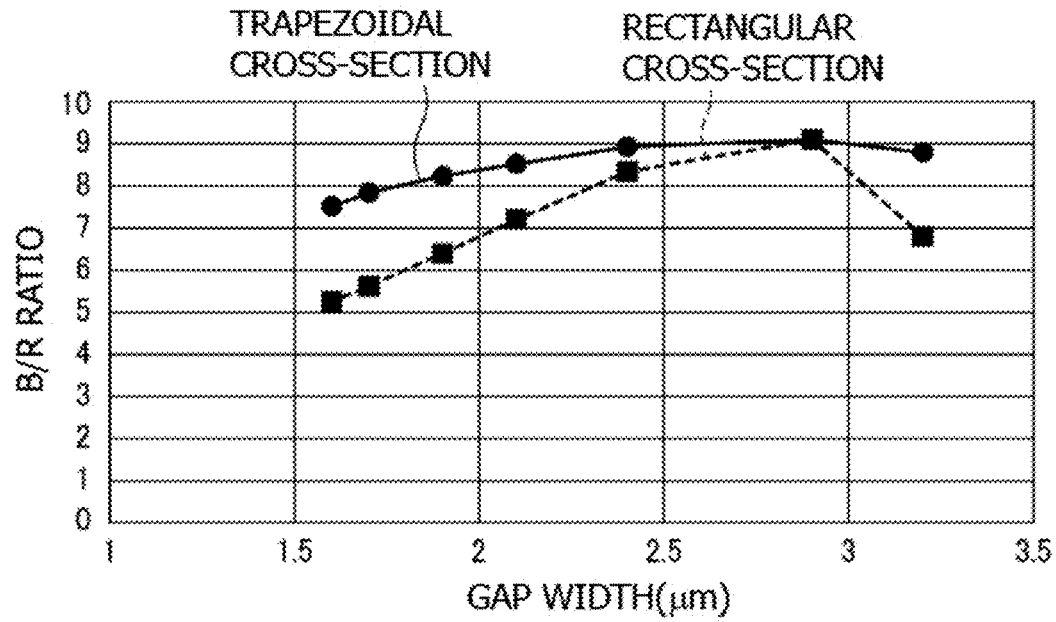
FIG. 13 is a graph showing the relationship between the B/R ratio and the gap width (gw) in a trapezoidal cross-section and in a rectangular cross-section in the case of the representative directional coupler of which the properties are exhibited in FIG. 5.

Relationship Between Dispersion in Gap Width During Process for Manufacturing Multiplexer and Properties of the Multiplexer FIG. 13 is a graph showing the relationship between the B/R ratio and the gap width (gw) in a trapezoidal cross-section and in a rectangular cross-section in the case of the representative directional coupler of which the properties are exhibited in FIG. 5. The B/R ratio in the trapezoidal cross-section in FIG. 13 is the maximum value of the B/R ratio, which means the value of the B/R ratio when the B/R ratio is maximum relative to the respective gap widths (gw). As shown in FIG. 5, this maximum value of the B/R ratio is gained when the top base/bottom base ratio is in the range of a trapezoid (range where the top base/bottom base ratio is 0.95 or less and not less than 0). The maximum value of the B/R ratio within the range where the top base/bottom base ratio in the trapezoidal cross-section is 0.95 or less and not less than 0 is selected as a representative value, and the dispersion in the B/R ratio relative to the dispersion (fluctuation) in the gap width is shown. Meanwhile, the B/R ratio in the rectangular cross-section is the same as the B/R ratio in the case where the top base/bottom base ratio is 1 in FIG. 5.

According to FIG. 13, the dependency of the B/R ratio on the gap width (gw) is clearly smaller in the case of a trapezoidal cross-section as compared to the case of a rectangular cross-section, and thus, even in the case where there is a dispersion (fluctuation) during the manufacture in the gap width that accompanies the miniaturization of the gap, the dimensions of the fluctuation in the B/R ratio become smaller in the case of a trapezoidal cross-section as compared to the case of a rectangular cross-section. As a result of this, the dispersion during the manufacture in the multiplexing properties of the waveguide-type multiplexer can be reduced, which is industrially important.

Concerning Process for Manufacturing Multiplexer and Dispersion (Fluctuation) in Gap Width Here, the dispersion (fluctuation) in the gap width that accompanies the miniaturization of the gap is described in terms of the relationship with the process for manufacturing a multiplexer. Multiplexers are usually manufactured in the following process.

(1) A first $SiO_2$ glass film and a second $SiO_2$ glass film that includes a dopant for increasing the refractive index are successively deposited on an Si substrate or an $SiO_2$ substrate, and light is exposed to the resist that has been applied onto the second $SiO_2$ glass film so that a mask pattern is developed, and the thus-formed mask pattern is used to etch the second $SiO_2$ glass film that includes the dopant so that portions of the second $SiO_2$ glass film that become waveguide cores remain.

(2) After that, a third $SiO_2$ glass film is further deposited as a film that becomes an over clad, and thus, a multiplexer is formed of waveguides having a core that is made of the second $SiO_2$ glass that includes the dopant for increasing the refractive index and that is surrounded by the first and third $SiO_2$ glass clads.

In this case, the gap width between the waveguides in the directional coupler of the multiplexer fluctuates due to the microscopic fluctuations in the conditions when etching the second $SiO_2$ glass that includes the dopant, that is to say, a dispersion takes place.

Here, though the gap width between the waveguides fluctuates, the distance between the center of the two waveguides (distance between waveguides (d)) that form the directional coupler is determined only by the mask pattern and does not depend on the microscopic fluctuations in the conditions when etching. Therefore, dependency of the properties that are shown in FIGS. 5, 7, 8, 9, 10, 11, and 13 and in the below-described FIG. 16 on the gap width (gw) is found by fixing the distance between waveguides (d).

Here, the properties that are shown in FIGS. 5, 7, 8, 9, 10, 11, 13, and 16 exhibit the same tendency even when the distance between waveguides (d) slightly fluctuates. Therefore, the results that are gained in these figures are naturally effective as well in the case of a multiplexer that is manufactured through a process other than the above-described manufacturing process that includes (1) and (2). For example, the results can be applied to all the cases where the structure is formed of two waveguides that are aligned side-by-side in close proximity, including a case where the core portions are formed through compression molding of the second $SiO_2$ glass film by using a mold such as for nanoimprint.

In the compression molding by using a mold for nanoimprint, the mold having the shape of the core of a waveguide is pressed against an $SiO_2$ glass core layer in order to generate a core having a ridge form. The distance between waveguides d and the gap width gw are dispersed when the mold is manufactured and when the mold is pressed against the glass core layer, and thus, a dispersion takes place in the gap width between the waveguides.

Here, an example of a case where the second $SiO_2$ glass core that includes a dopant for increasing the refractive index is totally surrounded by the first and third $SiO_2$ glass clad materials (channel-type optical waveguide) is shown. However, the structure for confining light within the core naturally exhibits the same dependency on the cross-sectional shape of the waveguides even in the case where the second $SiO_2$ glass core is not totally surrounded by the $SiO_2$ glass clad material. A ridge-type waveguide can be cited as such an example. In a ridge-type waveguide, a first $SiO_2$ glass film and a second $SiO_2$ glass film that includes a dopant for increasing the refractive index are formed, and the two glass films are etched into a ridge shape through a mask pattern so as to form a core in a ridge form. No clad layer is formed on the sides and the top surface of the core, which thus make contact with the air. Accordingly, the gap width between the waveguides in the directional coupler of the multiplexer fluctuates due to microscopic fluctuations in the conditions for the manufacture in the case of the ridge-type waveguides as well.

Though a multiplexer having waveguides with a core made of $SiO_2$ glass that includes a dopant for increasing the refractive index and that is surrounded by an $SiO_2$ glass clad is cited as an example here, either the core or the clad is not limited to these materials. For example, any material that makes the refractive index of the core greater than the refractive index of the clad may be used, and in terms of the glass composition, (1) the glass of the core is not limited to $SiO_2$ glass that includes a dopant for increasing the refractive index, and (2) the glass of the clad is not limited to $SiO_2$ glass. Though examples of materials mainly made of $SiO_2$ glass are shown, the materials may be made of anything other than $SiO_2$ glass, and thus may be made of an organic compound such as a plastic material, for example.

Here, the superiority of an optical waveguide, of which the cross-section is asymmetric in the height direction including being trapezoidal, relative to the dispersion in the gap width is described in terms of the relationship between red and blue from among three primary colors of light; however, the same superiority exists in the form of the cross-section in terms of the relationship between red and green and between green and blue. Due to the same reason as in the below descriptions concerning the improvement in the efficiency of the mold coupling in the directional coupler itself, in the case of the relationship between red and green and between green and blue, the difference in the wavelength between the two colors is smaller, and the effects of improving the properties of the entirety of the multiplexer are relatively smaller as compared to the case of the relationship between red and blue. Therefore, the improvement in the properties of the directional coupler in the case of the relationship between red and blue greatly contributes to the improvements of the properties of the entire multiplexer.

Relationship Between B/R Ratio and Difference in Length Between Bottom Base and Top Base of Trapezoid So far, the B/R ratio of multiplexers has been evaluated by using the top base/bottom base ratio as the shape of the cross-section of waveguides that form a multiplexer. Next, the difference in the length between the bottom base and the top base of a trapezoid is used as an index that represents the shape of the cross-section of the waveguides in order to evaluate the B/R ratio of a multiplexer from different points of view.

Figure 14:
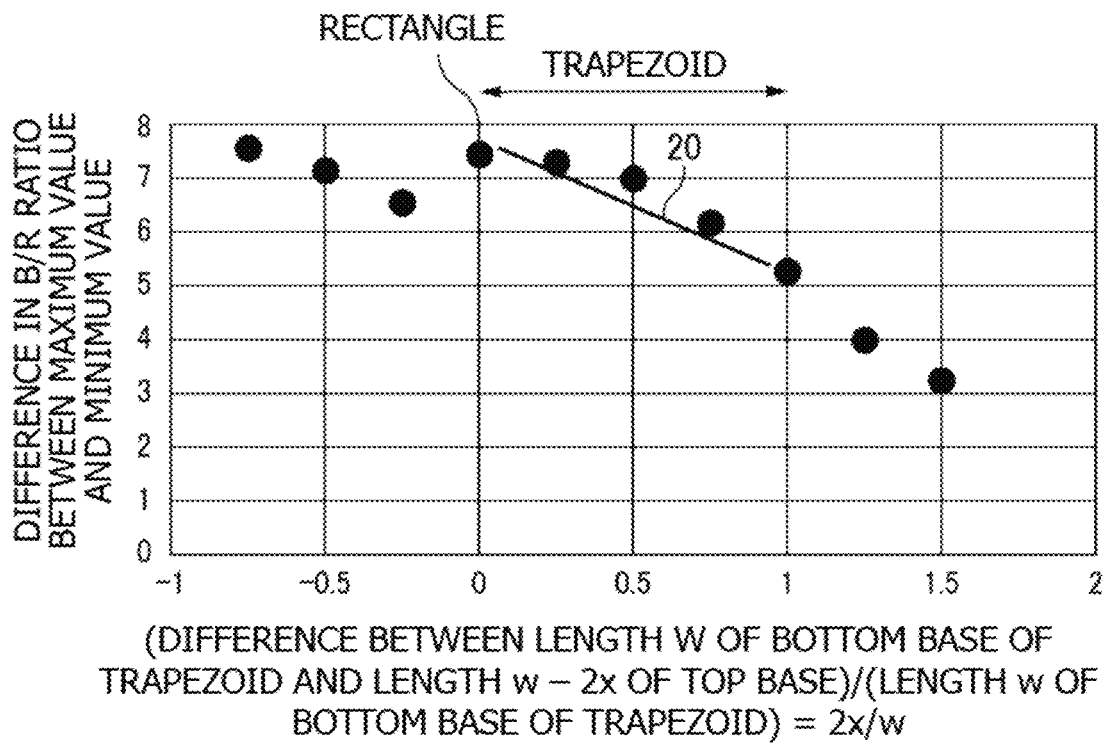
FIG. 14 shows the relationship between the difference in the B/R ratio between the maximum value and the minimum value in a directional coupler and (difference in the length of the bottom base and the top base of a trapezoid)/(length of the bottom base of the trapezoid).

FIG. 14 shows the relationship between the difference in the B/R ratio between the maximum value and the minimum value in a directional coupler and (difference in the length of the bottom base and the top base of a trapezoid)/(length of the bottom base of the trapezoid). According to (3) of FIG. 6A, the top base is (w−2x) and the bottom base is w, and therefore, the lateral axis indicates (difference in the length between the bottom base and the top base of a trapezoid)/(length of the bottom base of the trapezoid)=2x/w. The directional coupler used here is the same as the representative directional coupler of which the properties are shown in FIG. 5. Likewise, the fluctuation width in the gap width (gw) as a parameter and the fixed distance between waveguides (d) are the same.

The location of 2x/w=0 along the lateral axis in FIG. 14 corresponds to a rectangular cross-section, the region where 2x/w is greater than 0 corresponds to a trapezoidal cross-section, and the region where 2x/w is smaller than 0 corresponds to a reverse trapezoidal cross-section where the top base is greater than the bottom base. It can be seen from FIG. 14 that the difference in the B/R ratio between the maximum value and the minimum value clearly becomes smaller as the cross-section transits from a rectangle to a trapezoid. This is shown by a guideline 20. This also leads to the results that a directional coupler that is formed of waveguides of which the cross-section is trapezoidal has a smaller fluctuation width in the B/R ratio relative to the fluctuation in the gap width and a reduced dispersion in the multiplexing properties of the waveguide-type multiplexer, which is industrially important, than a directional coupler that is formed of waveguides of which the cross-section is rectangular in the same manner as in the case that is examined by using the top base/bottom base ratio in reference to FIGS. 7 through 12.

Optical Waveguide-Type Multiplexer According to the Second Embodiment where the Efficiency of Mode Coupling in Directional Coupler Itself (Multiplexing Performance of Optical Directional Coupler) is Increased to Solve Second Problem The first embodiment provides a configuration where a dispersion in the gap width caused by the dispersion during the process for manufacturing an optical waveguide-type multiplexer is improved. In the second embodiment, the core shape of the two optical waveguides in the multiplexing unit of the optical directional coupler can be made asymmetric in the height direction in such a manner as that of a trapezoid or the like in order to increase the efficiency in the mode coupling of the directional coupler itself (multiplexing performance of the optical directional coupler). In the following, the structure of a directional coupler that is used as a multiplexing unit in the optical waveguide-type multiplexer where it is possible to increase the properties of the optical waveguide-type multiplexer itself is described.

Figure 15:
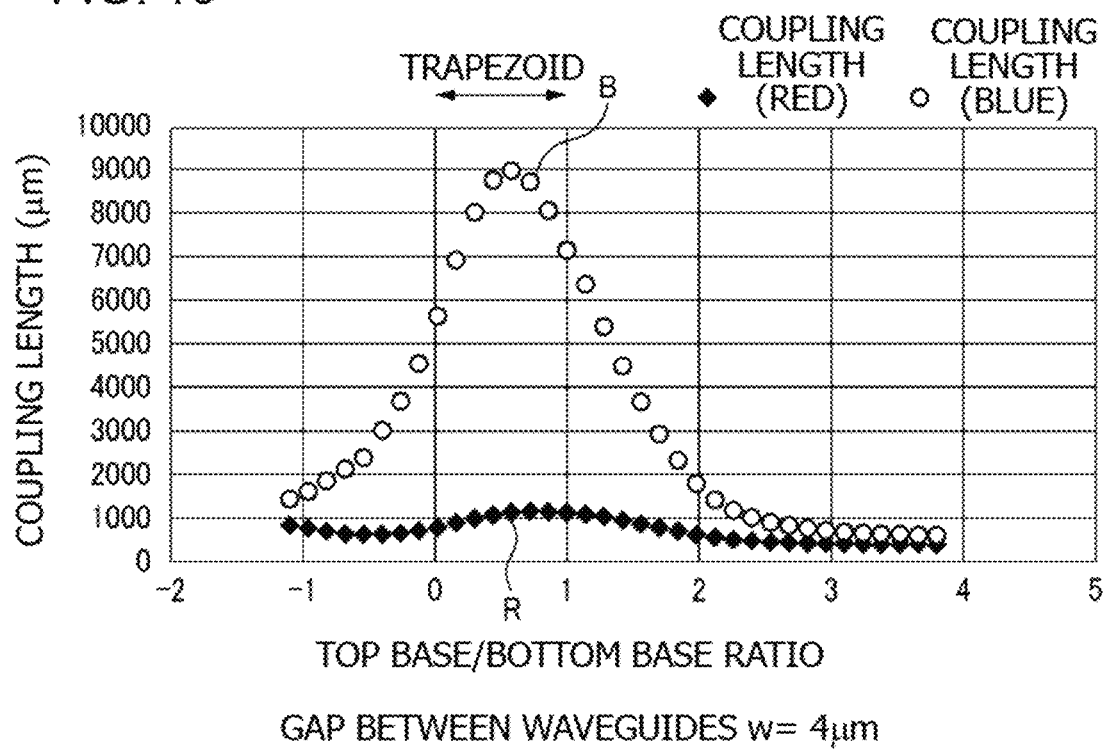
FIG. 15 is a graph showing the relationship between the coupling lengths of red and blue, respectively, and the top base/bottom base ratio in the case of a representative directional coupler of which the properties are shown in FIG. 5 (the difference in the refractive index between the core and clad is 0.8%, the height of the waveguides (h) is 1.6 μm, and the distance between the waveguides (d) is fixed to 4 μm).

FIG. 15 is a graph showing the relationship between the coupling lengths of red and blue, respectively, and the top base/bottom base ratio in the case of a representative directional coupler of which the properties are shown in FIG. 5 (the difference in the refractive index between the core and clad is 0.8%, the height of the waveguides (h) is 1.6 μm, and the distance between the waveguides (d) is fixed to 4 μm). In this case, the gap width (gw) is 1.9 μm and the width of the waveguides (w) is 2.1 μm.

As can be seen from FIG. 15, when the top base/bottom base ratio is in a range from 0 to 1 (the range of a trapezoid), the coupling length of blue B increases greatly, whereas the coupling length of red R does not increase very much and remains short. This means that the length of the waveguides during which blue light that propagates through one waveguide can transfer to the adjacent waveguide (coupling length of blue) increases. A possible reason for this is as follows: The field of red light that propagates through a waveguide is wide, whereas the field of green light is narrow, and therefore, in the case where the core cross-section of the waveguides is trapezoidal, the field of blue light having a short wavelength is confined in the vicinity of the bottom base where the spread of the field becomes narrower, whereas the spread of the field of red light having a long wavelength is affected by the trapezoid in a limited manner.

In the case of the way how red and blue light transfers as shown in (1) of FIG. 3, such multiplexing properties of an optical directional coupler that red light R completely transfers from the waveguide WG1 to the waveguide WG2, whereas blue light B barely transfers from the waveguide WG2 to the waveguide WG1, can be increased.

Figure 16:
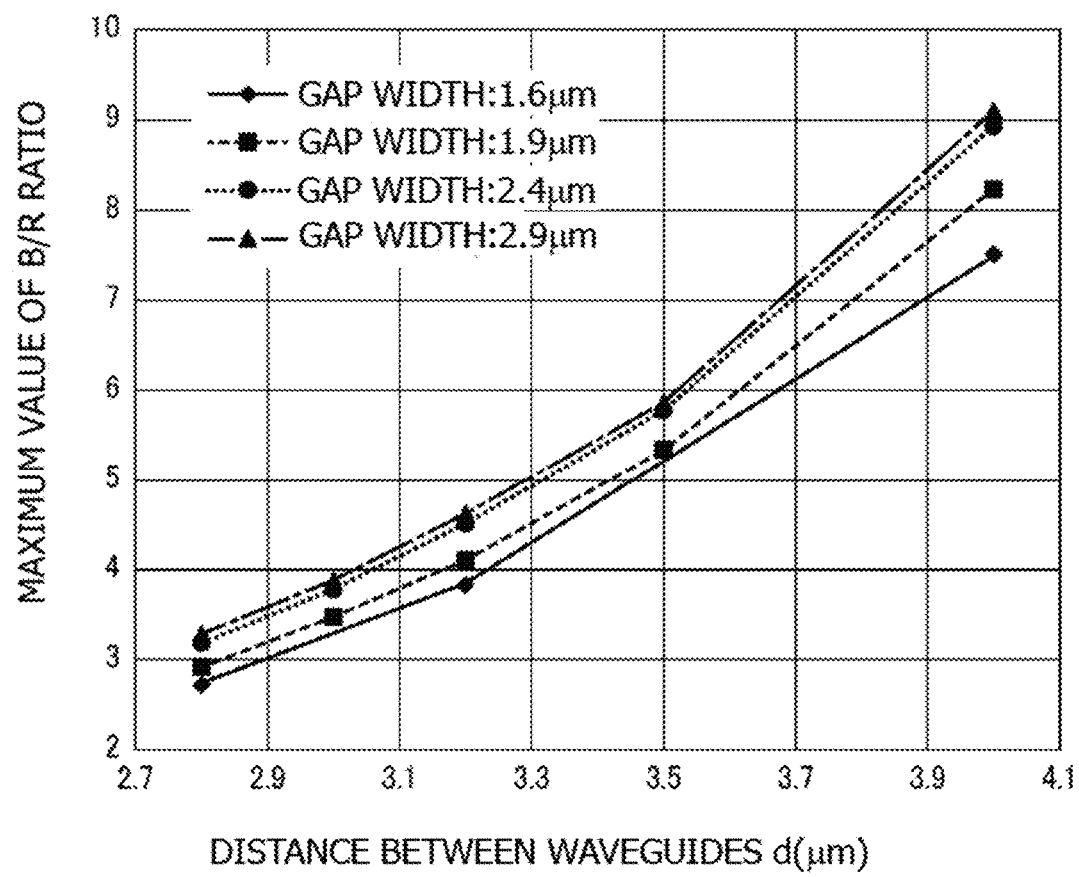
FIG. 16 is a graph where the gap width (g) is plotted as a parameter with the lateral axis indicating the distance between waveguides (d) and the longitudinal axis indicating the maximum value of the B/R ratio in the case of a representative directional coupler of which the properties are shown in FIG. 5.

FIG. 16 is a graph where the gap width (g) is plotted as a parameter with the lateral axis indicating the distance between waveguides (d) and the longitudinal axis indicating the maximum value of the B/R ratio in the case of a representative directional coupler of which the properties are shown in FIG. 5. In the same manner as in FIG. 13, the maximum value of the B/R ratio is the value of the B/R ratio when the B/R ratio becomes maximum relative to each gap width (gw), and this maximum value is gained when the top base/bottom base ratio is in a range of a trapezoid.

As can be seen from FIG. 16, the maximum value of the B/R ratio depends on the distance between waveguides (d) and covers a wide range from approximately 3 to approximately 9. Meanwhile, the dependency on the gap width (gw) as a parameter is small. It can be seen from this that the way how red and blue light transfers as shown in (2) and (3) of FIG. 3 can be implemented in the case where the cross-section of the waveguides is a trapezoid, and in addition, there is an advantage that the dependency on the gap width is small.

Concretely, blue light B transfers once during the time when red light R transfers four times in (2) of FIG. 3, and therefore, when the B/R ratio is approximately 4, the ratio of the coupling length LB of blue light B to the coupling length LR of red light R becomes LB:LR=4:1, which makes this type of transfer possible.

In addition, blue light B transfers once during the time when red light transfers three times in (3) of FIG. 3, and therefore, when the B/R ratio is approximately 3, the ratio of the coupling length LB of blue light B to the coupling length LR of red light R becomes LB:LR=3:1, which makes this type of transfer possible. It can be seen from the above description that both cases where the B/R ratio is approximately 4 and approximately 3 fall within the range shown in FIG. 16.

In (3) of FIG. 3 as well, as described above, it is better for the B/R ratio to be greater, and in FIG. 16, it is possible to make the B/R ratio sufficiently great up to approximately 9. Therefore, all the cases that provide a basic configuration of an optical waveguide-type multiplexer as in (1) to (3) of FIG. 3 can be implemented with trapezoidal waveguides.

The superiority of optical waveguides of which the core cross-section is asymmetric in the height direction (trapezoidal) is described in terms of the relationship between red and blue from among the three primary colors of light; however, it has already been described that similar superiority exists in terms of the relationship between red and green and between green and blue.

Propagation Mode of Waveguides that Form Directional Coupler

So far, examples of optical directional couplers where waveguides through which light in a single mode propagates are mainly used have been shown. Here, these waveguides are not strictly limited to those through which only light in a single mode is allowed to propagate. All the multiplexing properties and the effects that have been described so far can be applied even to waveguides through which light in a low-level mode other than the basic mode is allowed to propagate as long as the light is in a pseudo-basic mode where the main mode is the basic mode (the mode of which the light intensity is the greatest is the basic mode from among the propagation modes) in the same manner as in the examples where waveguides through which light in a single mode propagates are used, though the multiplexing properties slightly deteriorate. Even in the case where one waveguide in an optical directional coupler is a waveguide for allowing light in multiple modes to transfer, the mechanism of light transfer is basically the same as in the case of single-mode waveguides, and therefore, all the results that have been described so far can be applied in the same manner.

Next, examples in the first and second embodiments are described.

Example 1: Example where Core Cross-Section is Trapezoidal in Multiplexer in FIG. 1

Example 1 provides a three-primary color optical directional coupler shown in FIG. 1, and a transfer operation in the three optical multiplexing units thereof is the same as that described in FIG. 1; however, an additional description follows below. In the first multiplexing unit 110, blue light B that has propagated through the third optical waveguide 103 is split to the third and second optical waveguides. That is to say, the length L1 of the mode coupling region in the first multiplexing unit 110 is half of the distance through which blue light completely transfers to the second waveguide 102, and therefore, blue light is split to the third and second optical waveguides 50/50. The split blue light in the third waveguide 103 starts transferring again to the second waveguide 102 in the third multiplexing unit 130, and finally, the entirety of the blue light propagates through the second waveguide. In the case of blue light, the optical directional coupler is disconnected in the way between the first and third multiplexing units 110, 130 due to the existence of the second multiplexing unit 120; however, the combination of the first multiplexing unit 110 and the third multiplexing unit 130 can be considered to be one directional coupler. Meanwhile, the dimensions of the mode coupling of green light G are two times greater than those of blue light, and therefore, only the length L1 of the mode coupling region in the first multiplexing unit 110 can allow green light G in the second waveguide 102 to completely transfer to the adjacent third waveguide 103.

In the third multiplexing unit 130, red light R transfers from the second waveguide 102 to the third waveguide 103, and furthermore returns to the second waveguide 102. That is to say, the length L3 of the mode coupling region in the third multiplexing unit 130 is twice the coupling length along which red light transfers to the adjacent optical waveguide. Therefore, red light R transfers from the second waveguide 102 to the third waveguide 103, and furthermore returns from the third waveguide to the second waveguide so as to end up propagating through the original second waveguide 102. The above-described light transfer operation is based on the fact where the intensity of the mode coupling is approximately red:green:blue=4:2:1. The intensity of the mode coupling becomes greater as the length of light is longer. This is because the spread of propagating light from the optical waveguide (exudation) has a dependency on the wavelength.

The substrate 111 is made of Si, the clad layer 112 is made of SiO$_2$ glass, and the cores that form the optical waveguides 101, 102, and 103 are made of SiO$_2$ glass of which the refractive index is higher than that of the clad layer. The first through third waveguides 101 through 103 are waveguides for a basic mode or a pseudo-basic mode through which the light propagation in the basic mode is the largest component.

The first multiplexing unit 110, the second multiplexing unit 120, and the third multiplexing unit 130 are directional couplers. Here, the wavelength of red light is 0.633 μm, the wavelength of green light is 0.521 μm, and the wavelength of blue light is 0.448 μm. The first waveguide 101, the second waveguide 102, and the third waveguide 103 have a waveguide width (w) of 2.1 μm, and a waveguide height (h) of 1.6 μm. The distance between the waveguides (d) is 3.2 μm in the first multiplexing unit 110 and the third multiplexing unit 130, and is 4 μm in the second multiplexing unit 120. In addition, the core cross-section of at least the waveguide portions in the mode coupling region in the first through third waveguides is trapezoidal (the top base/bottom base ratio is 0.75). The core cross-section of whole portions of the first through third waveguides may be trapezoidal (the top base/bottom base ratio is 0.75). The difference in the refraction index between the core and the clad is 0.8%.

The multiplexers where the core cross-section of the waveguides is trapezoidal makes it possible for the entire length of the multiplexer to be reduced by approximately 10% as compared to the multiplexers where the core cross-section of the waveguides is rectangular, and thus, the efficiency of the mode coupling is increased. In addition, the yield of the manufacturer for the multiplexer can be increased by approximately 20%.

Example 2: Example of Multiplexer in FIG. 1 where Core Cross-Section has Such a Shape that Two Rectangles Having Different Widths are Layered on Top of Each Other Example 2 is an example of a three-primary color optical waveguide-type multiplexer shown in FIG. 1. The structure of the multiplexer in Example 2 is the same as that in Example 1 except for the cross-sectional structure of the waveguides. It is also the same as in Example 1 that the first through third waveguides 101 through 103 are waveguides for a basic mode or a pseudo-basic mode through which the light propagation in the basic mode is the largest component. The core cross-section of the waveguides in Example 2 has such a form that two rectangles with different widths are layered each other as shown in FIG. 6(5), where the width of the core in the upper tier is half of the width of the core in the lower tier, and the core in the upper tier and the core in the lower tier have the same height. The waveguide height (h) is 1.6 μm (the total of the heights of the core in the upper tier and the core in the lower tier), the distance between the waveguide (d) is 3.2 μm in the first multiplexing unit 110 and in the third multiplexing unit 130 and is 4 μm in the second multiplexing unit 120. Each multiplexing unit is formed of a directional coupler. The gap width (the gap width between the cores in the upper tier) is 0.8 μm in the first multiplexing unit 110 and in the third multiplexing unit 130, and is 1.9 μm in the second multiplexing unit 120. In addition, the top base/bottom base ratio is 0.85. The core cross-section of at least the waveguide portions in the mode coupling region in the first through third waveguides may have such a shape that two rectangles having different widths are layered each other.

The entire length of this multiplexer can be reduced by approximately 8% as compared to the multiplexers where optical waveguides of which the core cross-section is rectangular are used, and thus, the efficiency of the mode coupling improves. In addition, the yield of the manufacture for the multiplexer can be increased by approximately 30%.

Example 3: Example of a Multiplexer in FIG. 1 where the Cross-Section is a Trapezoid Having One Lateral Side being Diagonal Example 3 is an example of a three-primary color optical waveguide-type multiplexer shown in FIG. 1. The structure of the multiplexer in Example 3 is the same as that in Example 1, except for the structure in the cross-section of the waveguides. The core cross-section of the waveguides in Example 3 is a trapezoid having one lateral side being vertical and the other being diagonal as shown in FIG. 6(6), where the diagonal sides face each other between waveguides. The first waveguide 101, the second waveguide 102, and the third waveguide 103 have a waveguide width (w) of 2.1 μm and a waveguide height (h) of 1.6 μm. The distance between the waveguides (d) is 3.2 μm in the first multiplexing unit 110 and in the third multiplexing unit 130, and is 4 μm in the second multiplexing unit 120. In addition, the top base/bottom base ratio in the cross-section of the waveguides is 0.75. The core cross-section of at least the waveguide portions in the mode coupling region in the first through third waveguides may be in a trapezoidal shape where one lateral side is diagonal.

The entire length of this multiplexer can be reduced by approximately 5% as compared to the multiplexers where optical waveguides of which the cross-section is rectangular are used, and the efficiency of the mode coupling improves. In addition, the yield of the manufacture for the multiplexer can be increased by approximately 15%.

Example 4: Example of the Multiplexer in FIG. 1 and a Directional Coupler where the Gap Between Waveguides is Filled in Example 4 is an example of a three-primary color optical waveguide-type multiplexer shown in FIG. 1. The structure of the multiplexer in Example 4 is the same as that in Example 1, except for the structure of the cross-section of the waveguides. The core cross-section of the waveguides in Example 4 is in such a form that the gap between the waveguides shown in FIG. 6(7) is filled in. The first waveguide 101, the second waveguide 102, and the third waveguide 103 has a waveguide width (w) of 2.1 µm and a waveguide height (h) of 1.6 µm. The distance between the waveguides (d) is 3.2 µm in the first multiplexing unit 110 and in the third multiplexing unit 130, and is 4 µm in the second multiplexing unit 120. In addition, the ratio of the height by which the gap is filled in to the height of the waveguides is 0.2. The core cross-section of at least the waveguide portions in the mode coupling region in the first through third waveguides may be in a form where the gap between the waveguides is filled in.

The entire length of this multiplexer can be reduced by approximately 15% as compared to the multiplexers where optical waveguides of which the cross-section is rectangular are used, and the efficiency of the mode coupling improves. In addition, the yield of the manufacture for the multiplexer can be increased by approximately 30%.

Example 5: Example of the Multiplexer in FIG. 2 and the Core Cross-Section is a Trapezoid Example 5 is an example of a three-primary color optical waveguide-type multiplexer shown in FIG. 2. In this case, the multiplexer is formed of first through third waveguides 101 through 103 and first and second multiplexing units 110 and 120. The first through third waveguides 101 through 103 are waveguides for a basic mode or a pseudo-basic mode through which the light propagation in the basic mode is the largest component. These optical waveguides are embedded within the clad layer 112 that is formed on the substrate 111. The substrate 111 is made of Si, and the clad layer 112 is made of SiO$_2$ glass. In addition, the transfer operation in the three optical multiplexing units is the same as that described in reference to FIG. 2.

Here, the first multiplexing unit 110 and the second multiplexing unit 120 are directional couplers. The wavelength of red light is 0.633 µm, the wavelength of green light is 0.521 µm, and the wavelength of blue light is 0.448 µm. The first waveguide 101, the second waveguide 102, and the third waveguide 103 have a waveguide width (w) of 2.1 µm and a waveguide height (h) of 1.6 µm. The distance between the waveguides (d) is 3.2 µm in the first multiplexing unit 110 and in the second multiplexing unit 120. In addition, the cross-section of the waveguides is a trapezoid (the top base/bottom base ratio is 0.75). The core cross-section of at least the waveguide portions in the mode coupling region in the first through third waveguides may be a trapezoid. The difference in the refractive index between the core and the clad is 0.8%.

The yield of the manufacture for this multiplexer can be increased by approximately 20% as compared to the multiplexers where optical waveguides of which the cross-section is rectangular are used.

Figure 18:
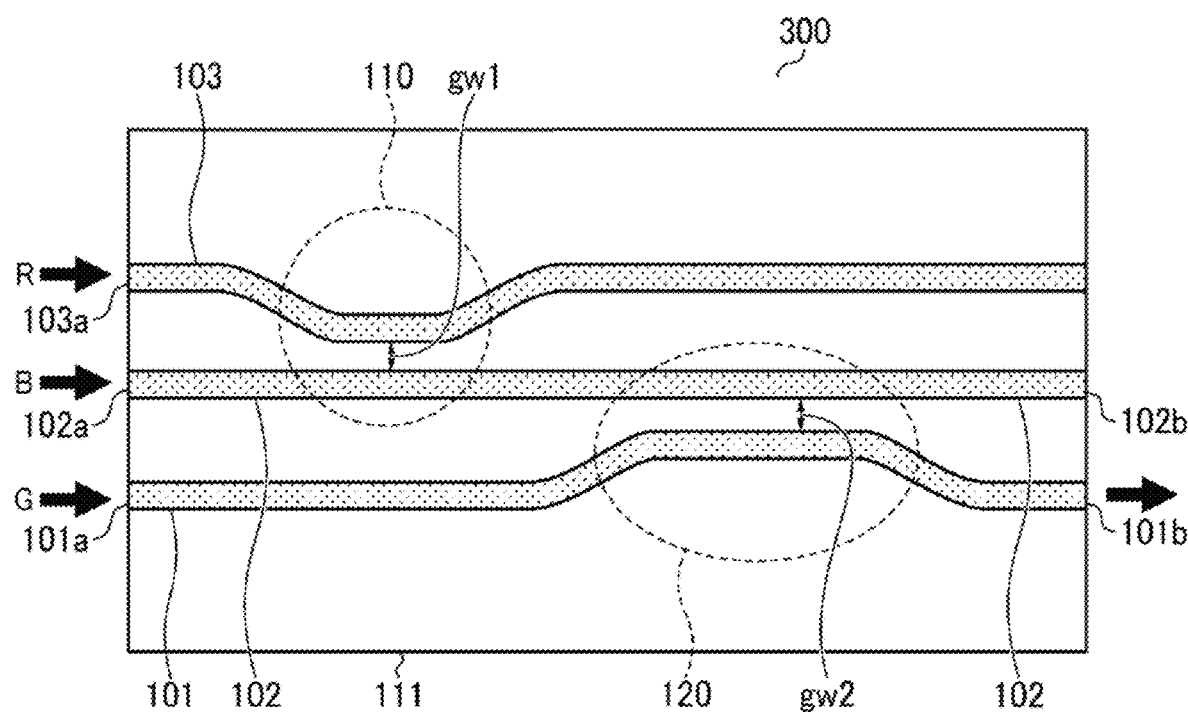
FIG. 18 is a plan diagram showing an example of the three-primary color optical waveguide-type multiplexer in Example 6.

Example 6: Example of the Multiplexer in FIG. 18 and the Core Cross-Section is a Trapezoid FIG. 18 is a plan diagram showing an example of the three-primary color optical waveguide-type multiplexer in Example 6. In the multiplexer 300 of this example, the plan structures of the first through third waveguides 101 through 103 and the first and second multiplexing units 110 and 120 are the same as those in FIG. 2. The first through third waveguides 101 through 103 are waveguides for a basic mode or a pseudo-basic mode through which the light propagation in the basic mode is the largest component in the same manner as in FIG. 2. Unlike in FIG. 2, green G, blue B, and red R are respectively allowed to enter into the first through third waveguides 101 through 103 in this example. In addition, the core cross-section of the respective waveguides is a trapezoid, though the side view at the left end of the substrate 111 is the same as in FIG. 2. These optical waveguides are embedded within the clad layer 112 that is formed on the substrate 111. The substrate 111 is made of Si, and the clad layer 112 is made of SiO$_2$ glass.

In addition, blue light B that has entered through the entrance end 102a of the second waveguide 102 propagates straight forward in the first multiplexing unit 110, and subsequently transfers to the first waveguide 101 in the second multiplexing unit 120, and then emits through the emission end 101b of the first waveguide 101. Red light R that has entered through the entrance end 103a of the third waveguide 103 transfers to the second waveguide 102 through the mode coupling in the first multiplexing unit 110 so as to propagate, and repeatedly transfers to and returns from the first waveguide 101 in the second multiplexing unit 120 so as to finally transfer to the first waveguide 101, and after that, emits through the emission end 101b of the first waveguide 101. Green light G that has entered through the entrance end 101a of the first waveguide 101 transfers to the second waveguide 102 through the mode coupling in the second multiplexing unit 120, then again returns to the first waveguide 101 in the second multiplexing unit 120, and after that, emits through the emission end 101b of the first waveguide 101. In this manner, all of the light emits through the emission end 101b of the same first waveguide 101.

The B/R ratio in the second multiplexing unit 120 is 3. In addition, the number of times red light R transfers in the second multiplexing unit 120 is three, the number of times green light G transfers is two, and the number of times blue light B transfers is one. Light transfers in the first multiplexing unit 110 as shown in FIG. 3(1), and light transfers in the second multiplexing unit 120 in the same manner as that shown in FIG. 3(3).

Here, the first multiplexing unit 110 and the second multiplexing unit 120 are directional couplers. The wavelength of red light is 0.633 µm, the wavelength of green light is 0.521 µm, and the wavelength of blue light is 0.448 µm. The first waveguide 101, the second waveguide 102, and the third waveguide 103 have a waveguide width (w) of 2.1 µm and a waveguide height (h) of 1.6 µm. The distance between the waveguides (d) is 4 µm in the first multiplexing unit 110 and is 3.2 µm in the second multiplexing unit 120. In addition, the cross-section of the waveguides is a trapezoid (the top base/bottom base ratio is 0.75). The core cross-section of at least the waveguide portions in the mode coupling region in the first through third waveguides may be a trapezoid. The difference in the refractive index between the core and the clad is 0.8%.

The entire length of this multiplexer can be reduced by approximately 10% as compared to the multiplexers where optical waveguides of which the cross-section is rectangular are used, and the efficiency of the mode coupling improves. In addition, the yield of the manufacture for the multiplexer can be increased by approximately 20%.

Example 7: Example of the Multiplexer in FIG. 19 and the Core Cross-Section is a Trapezoid in the Multiplexer in FIG. 19

Figure 19:
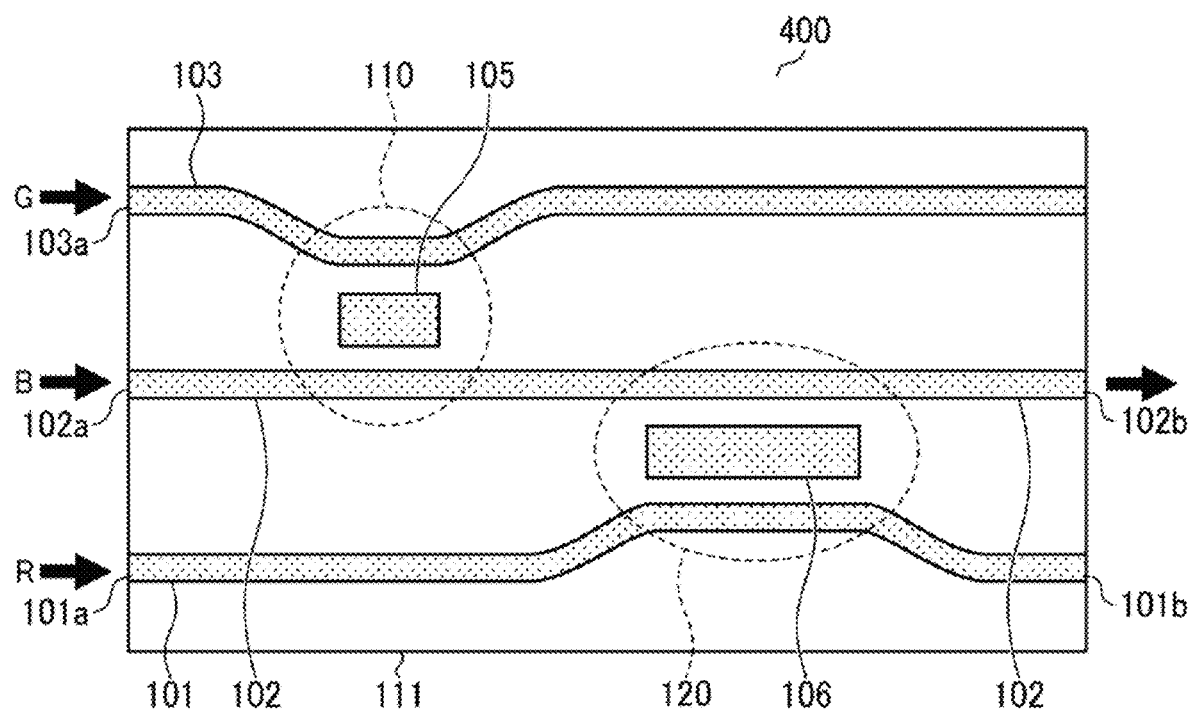
FIG. 19 is a plan diagram showing the multiplexer in Example 7.

FIG. 19 is a plan diagram showing the multiplexer in Example 7. The multiplexer 400 of this example is formed of first through third waveguides, a first multiplexing unit 110, and a second multiplexing unit 120. The first through third waveguides 101 through 103 are waveguides for a basic mode or a pseudo-basic mode through which the light propagation in the basic mode is the largest component. Here, two optical waveguides are not arranged so as to simply be adjacent to each other in the first multiplexing unit 110 and in the second multiplexing unit 120, but rather multimode optical waveguides 105 and 106 having a large waveguide width are arranged between the two optical waveguides. These multimode optical waveguides have such effects that the efficiency of the mode coupling in the first multiplexing unit 110 and in the second multiplexing unit 120 is increased.

An example of the multiplexing method in Example 7 is as follows. Second visible light (usually green light G) that has entered through the entrance end 103a of the third waveguide 103 transfers to the second waveguide 102 via the multimode optical waveguide 105 through the mode coupling in the first multiplexing unit 110, and propagates straight forward in the second multiplexing unit 120 so as to emit through the emission end 102b of the second waveguide 102.

First visible light (usually red light R) that has entered through the entrance end 101a of the first waveguide 101 transfers to the second waveguide 102 via the multimode optical waveguide 106 through the mode coupling in the second multiplexing unit 120 so as to propagate, and then emits through the emission end 102b of the second waveguide 102. Third visible light (usually blue light B) that has entered through the entrance end 102a of the second waveguide 102 causes mode coupling in the first multiplexing unit 110 and in the second multiplexing unit 120; however, the majority of the light propagates straight forward as it is so as to emit through the emission end 102b of the second waveguide 102. In this manner, all of the light emits through the emission end 102b of the same second waveguide 102.

In this case, the operation of allowing red light to transfer and blue light to propagate straight forward takes place in the multiplexing unit 120 in FIG. 3(1). Here, red light transfers via the multimode optical waveguide 106, and therefore, the way of transfer is more or less complicated; however, the principle thereof can be explained in reference to the operation shown in FIG. 3(1). It can be seen from the above that an increase in the multiplexing properties can be gained in the same manner as in the multiplexers shown in FIGS. 1, 2, and 18 by using the first through third waveguides 101 through 103 and the multimode optical waveguides 105 and 106 where the core cross-section is asymmetric in the height direction of the optical waveguides.

Optical Waveguide-Type Multiplexer According to Third Embodiment

In the multiplexers in FIGS. 1, 2, 18 and 19, a plurality of multiplexing units are arranged in different locations in the direction in which light propagates from the entrance side towards the emission side (horizontal direction from left to right in the figures), and therefore, the multiplexer is made longer in terms of the length in the direction in which light propagates (the light propagating direction or the horizontal direction), which makes it difficult to miniaturize the multiplexer. In contrast, in the optical waveguide-type multiplexer according to the third embodiment, a plurality of multiplexing units are arranged so as to be integrated in one place in the light propagating direction so that the multiplexer is made shorter in terms of the length in the light propagating direction.

First Multiplexer According to Third Embodiment

Figure 20:
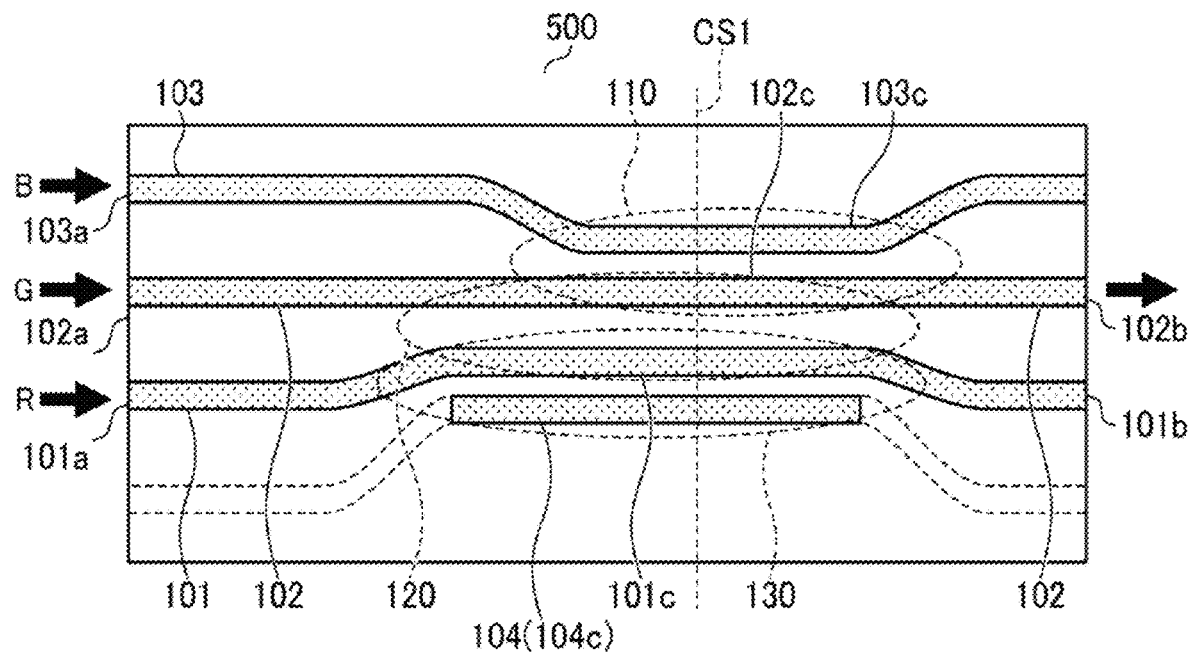
FIG. 20 is a diagram showing the configuration of the first optical waveguide-type multiplexer according to the third embodiment.
Figure 20:
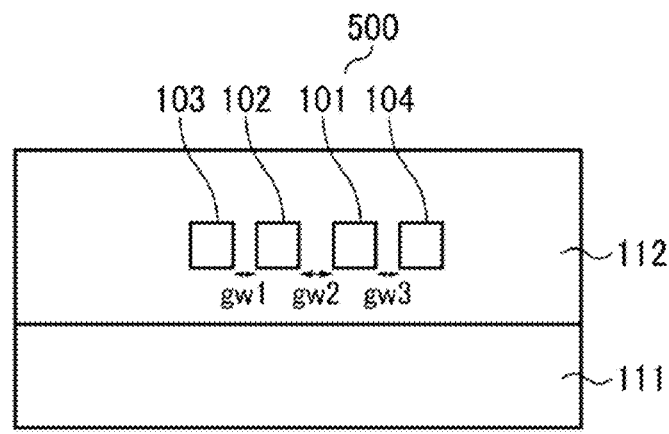

FIG. 20 is a diagram showing the configuration of the first optical waveguide-type multiplexer according to the third embodiment. FIG. 20 depicts (1) a plan diagram showing a first multiplexer 500 and (2) a cross-sectional diagram along the cross-sectional plane CS1. The first optical waveguide-type multiplexer 500 has first through fourth waveguides 101 through 104, and first through third multiplexing units 110 through 130. The first through fourth waveguides 101 through 104 are waveguides for a basic mode or a pseudo-basic mode through which the light propagation in the basic mode is the largest component. These multiplexing units are usually formed of an optical directional coupler. That is to say, the first multiplexing unit 110 is an optical directional coupler formed of respective portions of the third waveguide 103 and the second waveguide 102 and configured by a pair of waveguide portions in mode coupling regions 103c and 102c that have a predetermined length and are proximate to each other with a gap width gw1 in between. The second multiplexing unit 120 is an optical directional coupler formed of respective portions of the second waveguide 102 and the first waveguide 101 and configured by a pair of waveguide portions in mode coupling regions 102c and 101c that have a predetermined length and are proximate to each other with a gap width gw2 in between. The third multiplexing unit 130 is an optical directional coupler formed of respective portions of the first waveguide 101 and the fourth waveguide 104 and configured by a pair of waveguide portions in mode coupling regions 101c and 104c that have a predetermined length and are proximate to each other with a gap width gw3 in between.

Here, in optical directional couplers in multiplexing units, a pair of waveguide portions in mode coupling regions with a predetermined length and in linear form are arranged so as to be proximate to each other with a predetermined gap width in between. The predetermined length and the predetermined gap width are selected so that propagating light can transfer from one waveguide to the other waveguide. As described above, the gap width between waveguides and the predetermined length of the waveguides in linear form which allow light to transfer from one waveguide to the other differ depending on the wavelength of the propagating light.

In addition to the first through third waveguides 101 through 103, the first multiplexer 500 is provided with a fourth waveguide 104 on the opposite side to the second waveguide 102 relative to the first waveguide 101 (on the lower side in the figure). The respective ranges in the light propagating direction of the first through third multiplexing units 110 through 130 overlap each other in the direction that is perpendicular to the light propagating direction. As shown in the plan diagram in FIG. 20(1), these optical waveguides are usually embedded in the clad layer 112 that is formed on the substrate 111 in the same manner as in the above-described multiplexers.

The multiplexer 500 allows multiplexing as follows by adjusting the length or the like of the respective multiplexing units 110 through 130, for example. That is to say, according to one example of the multiplexing method, first visible light (usually red light R) that has entered through the entrance end 101a of the first waveguide 101 goes back and forth several times in the fourth waveguide 104, the first waveguide 101, the second waveguide 102 and the third waveguide 103 by the mode couplings in the three multiplexing units, the third multiplexing unit 130, the second multiplexing unit 120 and the first multiplexing unit 110, and finally emits through the emission end 102b of the second waveguide 102.

Second visible light (usually green light G) that has entered through the entrance end 102a of the second waveguide 102 transfers to the third waveguide 103 by the mode coupling in the first multiplexing unit 110 so as to propagate through the third waveguide 103, and after that, returns to and propagate through the second waveguide 102 so as to emit through the emission end 102b of the second waveguide 102.

Third visible light (usually blue light B) that has entered through the entrance end 103a of the third waveguide 103 transfers to the second waveguide 102 by the mode coupling in the first multiplexing unit 110 so as to emit through the emission end 102b of the second waveguide 102.

Here, the second visible light (usually green light G) and the third visible light (usually blue light B) partially transfer to the first waveguide 101 and the fourth waveguide 104 via the second multiplexing unit 110 and the third multiplexing unit 130, where this amount of transferred light can be reduced by adjusting the length of each multiplexing unit, for example. In this manner, light of every color is allowed to emit through the emission end 102b of the same second waveguide 102.

In the structure of the optical multiplexer shown in the plan diagram in FIG. 20(1), the respective ranges in the light propagating direction (in the horizontal direction in the diagram) of the first through third multiplexing units 110 through 130 overlap in the direction perpendicular to the light propagating direction (in the vertical direction in the diagram). In the case where this overlapping portion is sliced through the cross-sectional plane CS1, as shown in the cross-section in FIG. 20(2), four optical waveguides 103, 102, 101 and 104 are lined in parallel. It has been shown from simulation that the multiplexing efficiency improves in the case where the structures of the four optical waveguides (height and width in the core cross-section) and the arrangement (distance between the waveguides and the gap width) are both made symmetric between left and right in the cross-section. Therefore, as shown in the cross-section in FIG. 20(2), it is desirable for the linear portions (mode coupling regions) of the optical waveguides that form multiplexing units in this multiplexer to be symmetric between left and right in the cross-section. Here, the structures and the arrangement of the above-described optical waveguides may be approximately 95% symmetric between left and right, for example, even though they are not completely symmetric between left and right. In addition, the configuration is not limited to this symmetricity between left and right if particular importance is not placed on the properties.

It is also shown from simulation that the multiplexing efficiency further increases in the case where the gap width gw2 between the optical waveguides 102 and 101 that are located at the center from among the four optical waveguides 103, 102, 101 and 104 that form portions of multiplexing units, whose ranges in the light propagating directions of the first through third multiplexing units 110 through 130 overlap, is greater than the other gap widths gw1 and gw3. Therefore, it is desirable for the gap width gw2 between the optical waveguides 102 and 101 to be greater than the other gap widths gw1 and gw3.

It is technically meaningful in the following manner, for example, for the first multiplexer 500 according to the third embodiment to have the fourth waveguide 104. In the case where a multiplexer is formed of three waveguides that correspond to red, blue and green as the multiplexers shown in FIGS. 1, 2, and 18 and a plurality of multiplexing units (directional couplers) at least partially overlap in the longitudinal direction (the light propagating direction) of the multiplexer, multiplexed light cannot be emitted through the emission end of one waveguide. Thus, in the third embodiment, a forth waveguide is arranged on the outside of the three waveguides, so that the multiplexed light can be emitted through the emission end of one waveguide, even in the configuration where a plurality of multiplexing units are overlapped in the light propagating direction.

Concretely, in the case where a multiplexer is formed of three waveguides, it is possible to multiplex blue and green so that the multiplexed light emits through the emission end 102b of the second waveguide even when the multiplexing units 110 and 120 partially overlap as shown in FIG. 20. However, red cannot be multiplexed with the multiplexed light of blue and green, and thus, ends up being emitted through the emission end other than the emission end 102b. Therefore, in the third embodiment, a multiplexing unit 130 is configured by adding a fourth waveguide 104 to the outside of the first waveguide into which red enters, the red light that propagates through the first waveguide 101 is split at the multiplexers 120 and 130 to transfer into the second waveguide 102 and the fourth waveguide 104, but then, returns to the first waveguide 101, and ultimately the majority of the red light emits through the emission end 102b.

Figure 21:
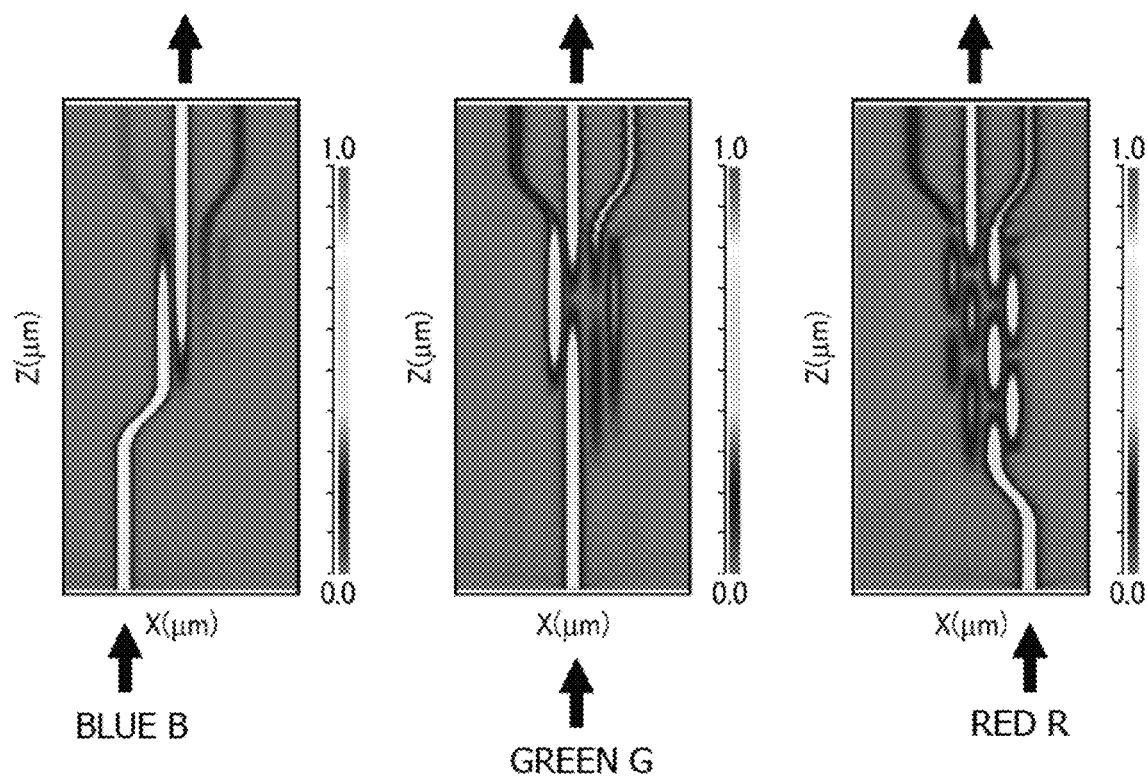
FIG. 21 is a diagram showing the results of simulation of the way how light of three colors progresses in the first multiplexer 500 according to the third embodiment.

FIG. 21 is a diagram showing the results of simulation of the way how light of three colors progresses in the first multiplexer 500 according to the third embodiment. Blue light B that has entered into the third waveguide 103 transfers to the second waveguide 102 in the first multiplexing unit 110 and propagates as it is so as to emit through the emission end 102b. This is the same as the transfer of blue B in FIG. 3(2). The green light G that has entered into the second waveguide 102 once transfers into the third waveguide 103 in the first multiplexing unit 110, and after that, transfers into the second waveguide 102 so as to propagate as it is, and then, emits through the emission end 102b. The phenomenon is caused by the difference in the coupling length depending on the wavelengths of blue light and green light.

Meanwhile, the red light R that has entered into the first waveguide 101 repeatedly transfers to and returns from the fourth waveguide 104 in the third multiplexing unit 130, while the red light gradually transfers to the second and the third waveguides 102 and 103 located slightly far away in the second multiplexing unit 120, and finally has transferred to the second waveguide 102 (in this location, since the fourth waveguide 104 has terminated or is far away, the third multiplexing unit 130 does not exist). As for this way of the transfer of the red light R, the linear portions of the optical waveguides (mode coupling regions) that form the three multiplexing units within the multiplexer have structures and the arrangement that are symmetric between left and right in the cross-section as described above, and thereby, the propagation mode of the four waveguides as a whole can be represented as the primary coupling (addition) of the independent propagation mode (basic mode) that is inherent to each optical waveguide, which finally can be made to be the propagation mode that is inherent to one waveguide 102.

In addition, since the above-described gap width gw2 between the first waveguide 101 and the second waveguide 102 is made greater than the other gap widths gw1 and gw3, blue light and green light of which the wavelengths are shorter than that of red light are prevented from transferring to the first waveguide 101 or the fourth waveguide 104 via the second multiplexing unit 120. Blue light and green light of which the wavelengths are shorter than that of red light leak (evanescent light) less from the waveguide in the lateral direction, which make it difficult for blue and green light to transfer over the greater gap width gw2. In this manner, it is desirable for the gap width gw2 between the first waveguide 101 and the second waveguide 102 to be made greater than the other gap widths gw1 and gw3 from the point of view of the optical multiplexing properties.

The symmetricity of the waveguides between left and right in the above-described overlapping multiplexing units is broken when the multiplexer is formed of three waveguides, and the gap between the first waveguide 101 and the second waveguide 102 is made greater than the gap between the second waveguide 102 and the third waveguide 103. It can be said that the fourth waveguide 104 is added in order to prevent the symmetricity from being broken in such a manner.

The technical meaning of adjusting the length of each multiplexing unit in the third embodiment is as follows. As shown in the way how red light progresses in FIG. 21, the length of the third multiplexing unit 130 through which red light in the first waveguide 101 transfers to the second waveguide 102 is determined, and at the same time, the lengths of the first and the second multiplexing units 110 and 120 through which blue light and green light transfer to the same second waveguide 102 are determined. The length of each multiplexing unit can be determined through simulation. It can also be determined through numerical calculation by means of the mode coupling theory; however, the calculation becomes extremely complicated.

Only the linear portion of the fourth waveguide 104 exists within a multiplexing unit 130 in FIG. 20; however, an S-shaped waveguide made of a curve and a waveguide for entrance or emission may be connected to the entrance side or the emission side of the fourth waveguide 104 in order to form an entrance or emission end in the same manner as the other optical waveguides 101, 102, and 103. Such entrance and emission ends are shown in FIG. 20 with broken lines. An S-shaped waveguide and a waveguide for emission can be provided on the emission side of the fourth waveguide 104 to prevent a slight amount of red light that propagates through the fourth waveguide 104 from becoming stray light and propagating through the inside of the clad layer. It is also possible to allow another light beam to enter through the entrance end of the waveguide on the entrance side of the fourth waveguide 104, which is depicted with broken lines.

In addition, the optical waveguides 103, 102, 101, and 104 may have a structure where the core cross-section is symmetric in the height direction such as being rectangular or may have a structure where the core cross-section is asymmetric in the height direction in order to increase the properties as the first embodiment. In this case, such an operation takes place in the first multiplexing unit 110 that red light returns and blue light transfers as shown in FIG. 3(2). Here, red light transfers to the second waveguide 102 via the third and second multiplexing units 130 and 120, and therefore, the manner of transfer is more or less complicated; however, the principle thereof can be explained in reference to the operation shown in FIG. 3(2).

In the first multiplexer 500 according to the third embodiment shown in FIG. 20, the ranges in the longitudinal direction of all the multiplexing units overlap, and therefore, the total length of the multiplexer can be shortened as compared to the multiplexers shown in FIGS. 1 and 2.

Second Multiplexer According to Third Embodiment

Figure 22:
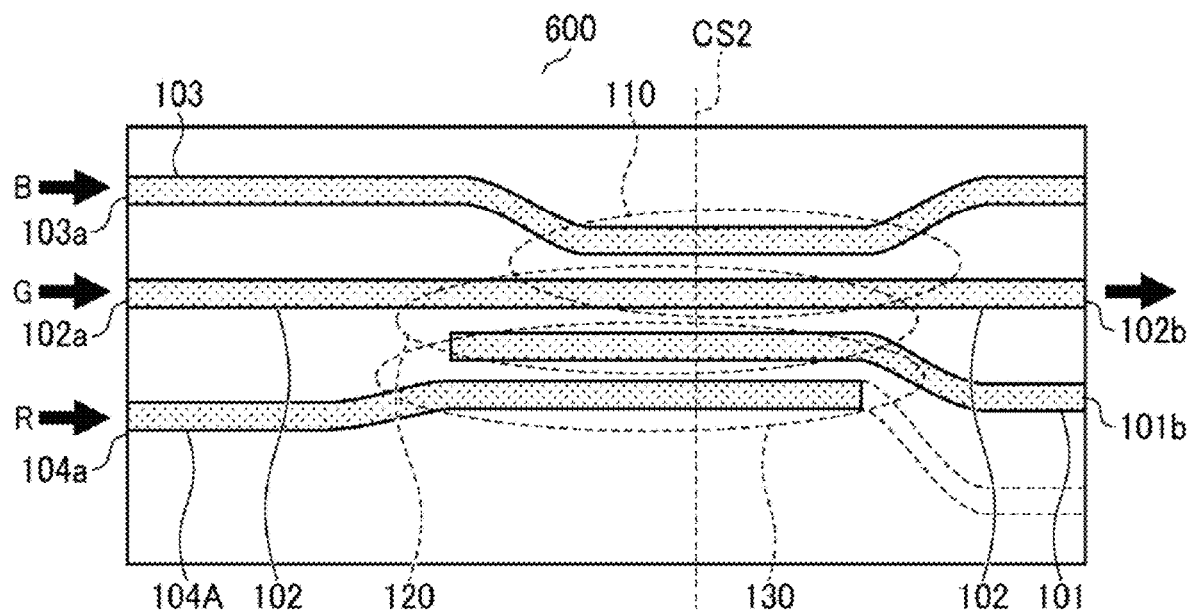
FIG. 22 is a diagram showing the configuration of a second optical waveguide-type multiplexer according to the third embodiment.
Figure 22:
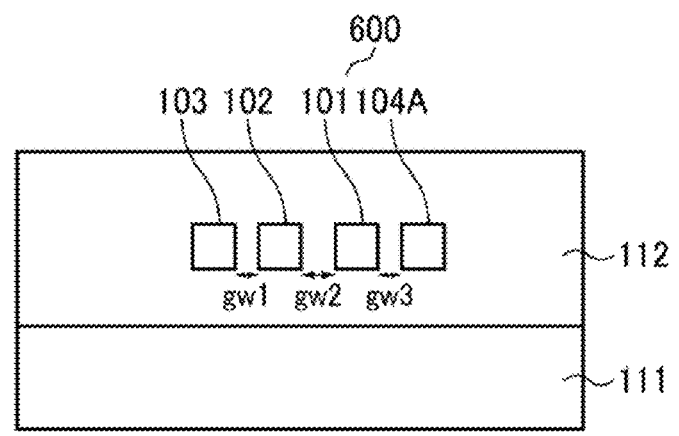

FIG. 22 is a diagram showing the configuration of a second optical waveguide-type multiplexer according to the third embodiment. FIG. 22 depicts a plan diagram showing a second multiplexer 600 and a cross-sectional diagram showing the same along the cross-section CS2. In the same manner as the structure shown in FIG. 20, the second optical waveguide-type multiplexer 600 has first through fourth waveguides 101 through 104A and first through third multiplexing units 110 through 130. The first through fourth waveguides 101 through 104A are waveguides for a basic mode or a pseudo-basic mode through which the light propagation in the basic mode is the largest component. These multiplexing units are usually formed of a directional coupler. The second multiplexer 600 has the fourth waveguide 104A in addition to the first through third waveguides 101 through 103 where red is allowed to enter into the fourth waveguide 104A, there is no waveguide on the entrance side of the first waveguide 101, and the ranges in the light propagating direction of the first through third multiplexing units 110 through 130 overlap each other. That is to say, red is not allowed to enter into the first waveguide 101, and instead, red light R is allowed to enter into the fourth waveguide 104A in the second multiplexer 600 in FIG. 22, of which the configuration is thus different from that of the first multiplexer 500 in FIG. 20. The pairs of waveguides that form the first through third multiplexing units 110 through 130 are the same as those in the first multiplexer 500 in FIG. 20. As shown in the cross-sectional diagram in FIG. 22(2), these optical waveguides are usually embedded within the clad layer 112 formed on the substrate 111 in the same manner as in the multiplexers that have been described so far.

Multiplexing in the second multiplexer 600 becomes possible as follows, for example, by adjusting the lengths of the respective multiplexing units 110 through 130. That is to say, according to one example of the multiplexing method, the first visible light (usually red light R) that has entered through the entrance end 104a of the fourth waveguide 104A goes back and forth between the fourth waveguide 104A, the first waveguide 101, the second waveguide 102, and the third waveguide 103 several times through the mode coupling between the three multiplexing units, the third multiplexing unit 130, the second multiplexing unit 120, and the first multiplexing unit 110 so as to finally emit through the emission end 102b of the second waveguide 102.

The second visible light (usually green light G) that has entered through the entrance end 102a of the second waveguide 102 mode couples in the first multiplexing unit 110 to transfer into the third waveguide 103 and propagate, and after that, returns to the second waveguide 102 and propagates, and then, emit through the emission end 102b of the second waveguide 102. Here, part of the second visible light (usually green light G) and the third visible light (usually blue light B) transfers to the first waveguide 101 and the fourth waveguide 104 via the second multiplexing unit 120 and the third multiplexing unit 130, however the amount of transferred light can be reduced by adjusting the length of each multiplexing unit. In this manner, light of every color emits through the emission end 102b of the same second waveguide 102.

In the structure of the second multiplexer 600 in FIG. 22 as well, the ranges in the light propagating direction of the first through third multiplexing units 110 through 130 overlap each other. As shown in the cross-section CS2 of the overlapping portions in the cross-sectional diagram of FIG. 22(2), the four optical waveguides 103, 102, 101, and 104A that form the multiplexing units may be made symmetric between left and right in terms of both the structure of the optical waveguides (the height and the width of the core cross-section) and the arrangement thereof (the distance between waveguides and the gap width). In this case it has been shown from simulation that the multiplexing efficiency increases. Therefore, as shown in the cross-sectional diagram of FIG. 22(2), it is desirable for the linear portions (mode coupling regions) of the four optical waveguides 101 through 104A that form the first through third multiplexing units to be symmetric between left and right in the multiplexer 600 as well. Here, the structure and the arrangement of the above-described optical waveguides may be, for example, approximately 95% symmetric between left and right even if they are not completely symmetric between left and right. In addition, the configuration is not limited to this symmetricity between left and right if particular importance is not placed on the properties of multiplexing efficiency.

It is also shown from simulation that the multiplexing efficiency further increases in the case where the gap width gw2 between the optical waveguides 102 and 101 that are located at the center from among the four optical waveguides 103, 102, 101 and 104A, which form the respective portions of multiplexing units in the range where the first through third multiplexing units 110 through 130 overlap in the longitudinal direction, is greater than the other gap widths gw1 and gw3.

Figure 23:
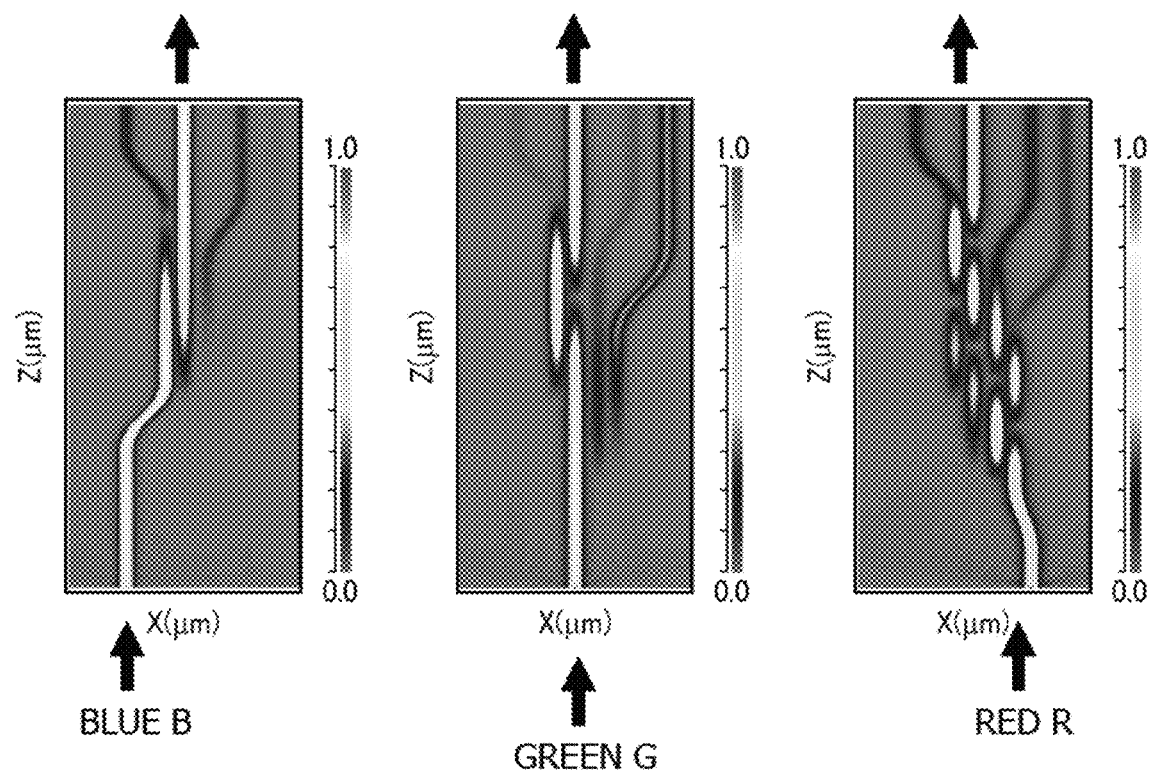
FIG. 23 is a diagram showing the results of simulation of the way how light of three colors progresses in the second multiplexer 600 according to the third embodiment.

FIG. 23 is a diagram showing the results of simulation of the way how light of three colors progresses in the second multiplexer 600 according to the third embodiment. Blue light B that has entered into the third waveguide 103 and green light G that has entered into the second waveguide 102 transfer in the same manner as in the first multiplexing unit 110 and in the second multiplexing unit 120 in the first multiplexer 500 shown in FIG. 21. Meanwhile, the red light R that has entered into the fourth waveguide 104A repeatedly transfers to and returns from the first waveguide 101 in the third multiplexing unit 130, while the light gradually transfers to the second and the third waveguides 102 and 103 that are located slightly far away in the second multiplexing unit 120 and in the first multiplexing unit 110, and finally has transferred to the second waveguide 102 (in this location, the fourth waveguide 104 has terminated or is far away and the third multiplexing unit 130 does not exist).

In FIG. 22, an entrance waveguide and an S-shaped waveguide are connected to the fourth optical waveguide 104A, and an S-shaped waveguide and an emission waveguide are connected to the first optical waveguide 101; however, an S-shaped waveguide and an emission waveguide may off course be connected to the emission side of the fourth optical waveguide 104A (see the broken lines in FIG. 22), and in this case, a slight amount of red light that propagates through the fourth optical waveguide 104A can be prevented from becoming stray light within the clad layer. In addition, an entrance waveguide and an S-shaped waveguide may be connected to the entrance side of the optical waveguide 101, or entrance and emission ends may be formed in the same manner as in other optical waveguides 102 and 103.

In addition, in the second multiplexing unit 600 in FIG. 22 as well, the optical waveguides 103, 102, 101, and 104 may have a structure where the core cross-section is symmetric in the height direction such as being rectangular or may have a structure where the core cross-section is asymmetric in the height direction in order to increase the properties. In this case, such an operation takes place in the first multiplexing unit 110 that red light in FIG. 3(2) returns back and blue light transfers. Here, the red light that has entered into the fourth waveguide 104A transfers to the second waveguide 102 via the third and second multiplexing units 130 and 120, and therefore, the manner of transfer is more or less complicated; however, the principle thereof can be explained in reference to the operation shown in FIG. 3(2).

Third and Fourth Multiplexers According to Third Embodiment

Figure 24:
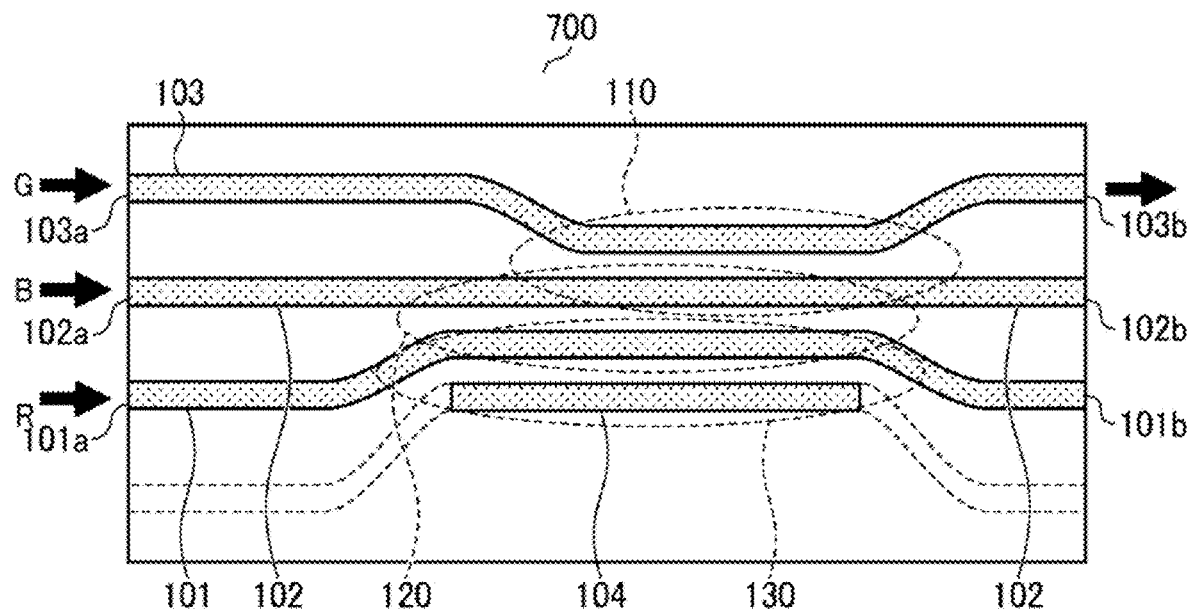
FIG. 24 is a diagram showing the third and fourth optical waveguide-type multiplexers according to the third embodiment.
Figure 24:
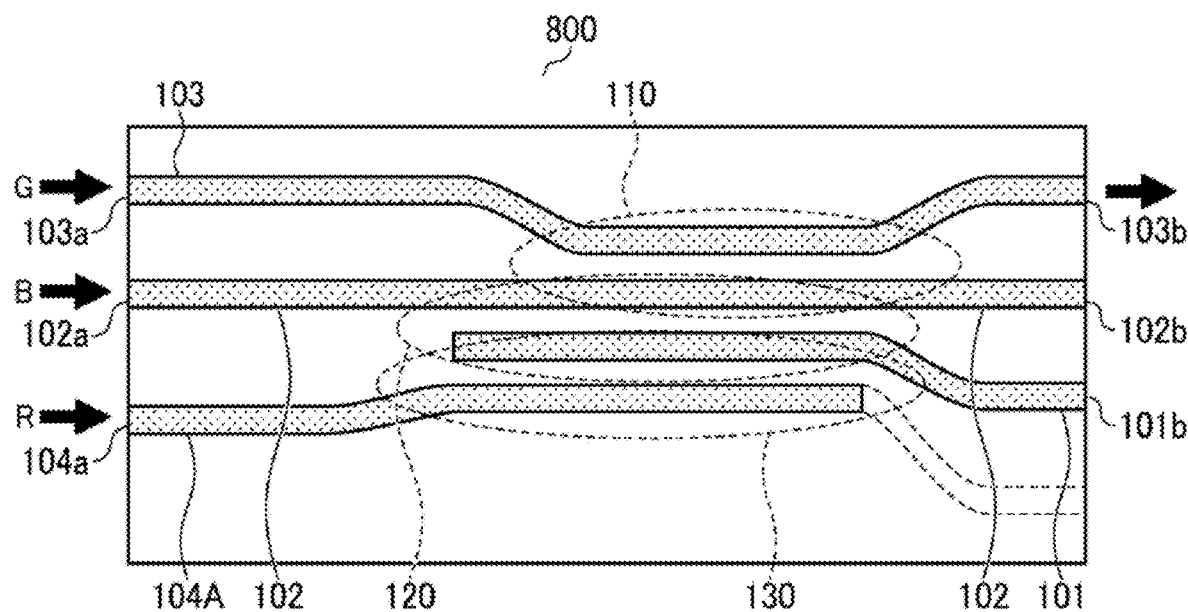

FIG. 24 is a diagram showing the third and fourth optical waveguide-type multiplexers according to the third embodiment. FIG. 24(1) is a plan diagram showing the third optical waveguide-type multiplexer 700. The basic structure of the third optical waveguide-type multiplexer of this embodiment is the same as that of the first multiplexer 500 shown in FIG. 20, and therefore, the description is not repeated. Here, the third multiplexer 700 is different from the first multiplexer 500 in FIG. 20 in that blue light B enters into the second waveguide 102, green light G enters into the third waveguide 103, and the multiplexed light of three light beams emits through the emission end 103b of the third waveguide 103.

The third multiplexer 700 of this embodiment can multiplex as follows by adjusting the length of each multiplexing unit. That is to say, according to one example of the multiplexing method, first visible light (usually red light R) that has entered through the entrance end 101a of the first waveguide 101 goes back and forth several times between the fourth waveguide 104, the first waveguide 101, the second waveguide 102, and the third waveguide 103 through the mode coupling in the three multiplexing units (the third multiplexing unit 130, the second multiplexing unit 120, and the first multiplexing unit 110) so as to finally emit through the emission end 103b of the third waveguide 103.

Third visible light (usually blue light B) that has entered through the entrance end 102a of the second waveguide 102 transfers to the third waveguide 103 through the mode coupling in the first multiplexing unit 110 so as to emit through the emission end 103b of the third waveguide 103. Second visible light (usually green light G) that has entered through the entrance end 103a of the third waveguide 103 transfers to the second waveguide 102 through the mode coupling in the first multiplexing unit 110 and propagates, and after that returns to the third waveguide 103 and propagate, and then emits through the emission end 103b of the third waveguide 103.

Here, partial light of the second visible light (usually green light G) and the third visible light (usually blue light B) transfers to the first waveguide 101 and the fourth waveguide 104 via the second multiplexing unit 120 and the third multiplexing unit 130, where the amount of the transferred light can be reduced by adjusting the length of each multiplexing unit. As described above, light of all colors emits through the emission end 103b of the same third waveguide 103.

In the case of the structure of the third multiplexer 700 in FIG. 24(1) as well, the arrangement in which the ranges in the light propagating direction of the respective multiplexing units overlap, the relationship between the structures and the arrangement of the respective optical waveguides, the installation of entrance and emission ends in the fourth waveguide, the cross-sectional structure of the respective waveguides and the characteristics of the multiplexer are the same as in the case of the structure shown in FIG. 20.

FIG. 24(2) is a plan diagram showing the fourth optical waveguide-type multiplexer 800 in the third embodiment. The basic structure of the fourth optical waveguide multiplexer 800 of this embodiment is the same as that of the second multiplexer 600 shown in FIG. 22, and therefore, the description is not repeated. Here, the fourth multiplexer 800 is different from the second multiplexer 600 in FIG. 22 in that blue light B enters into the second waveguide 102, green light G enters into the third waveguide 103, and the multiplexed light of three light beams emits through the emission end 103b of the third waveguide 103.

The fourth multiplexer 800 of this embodiment can multiplex as follows by adjusting the length of each multiplexing unit. That is to say, according to one example of the multiplexing method, first visible light (usually red light R) that has entered through the entrance end 104a of the fourth waveguide 104 goes back and forth between the fourth waveguide 104A, the first waveguide 101, the second waveguide 102, and the third waveguide 103 through the mode coupling in the three multiplexing units (the third multiplexing unit 130, the second multiplexing unit 120, and the first multiplexing unit 110) so as to finally emit through the emission end 103b of the third waveguide 103.

Third visible light (usually blue light B) that has entered through the entrance end 102a of the second waveguide 102 transfers to the third waveguide 103 through the mode coupling in the first multiplexing unit 110 and emits through the emission end 103b of the third waveguide 103. Second visible light (usually green light G) that has entered through the entrance end 103a of the third waveguide 103 transfers to the second waveguide 102 through the mode coupling in the first multiplexing unit 110 and propagates, and after that returns to the third waveguide 103 and propagates, and thus emits through the emission end 103b of the third waveguide 103.

Figure 25:
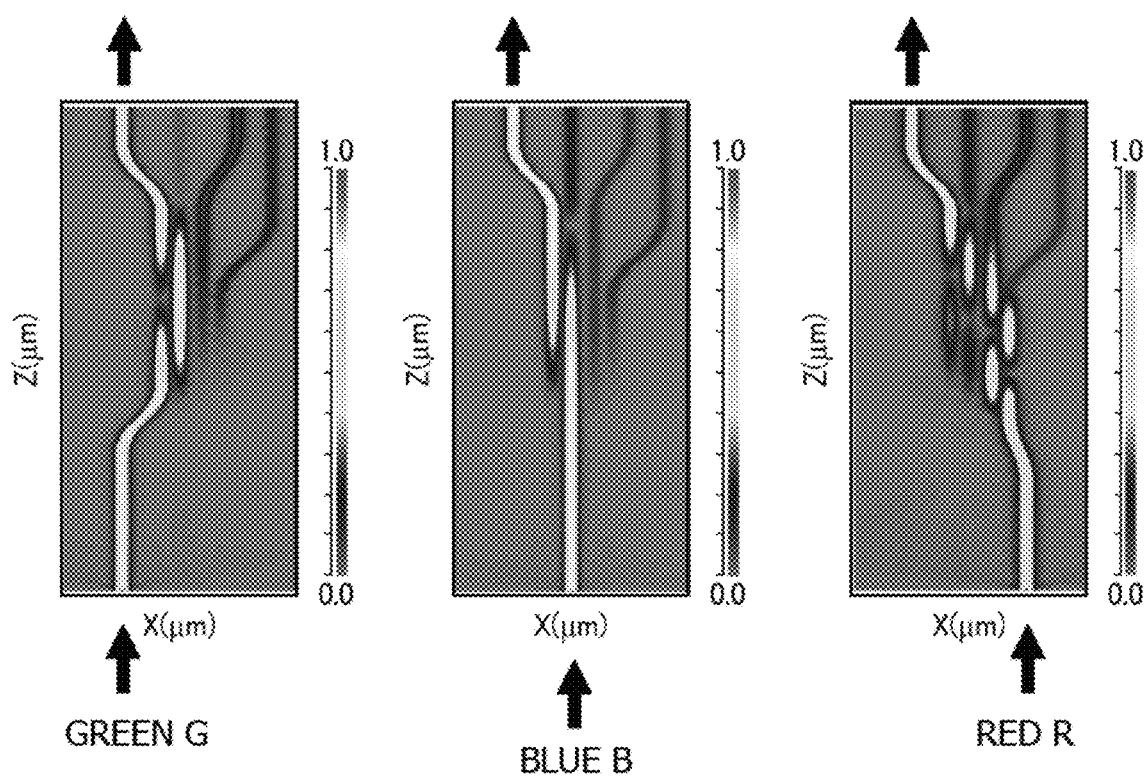
FIG. 25 is a diagram showing the results of simulation for the way how light of three colors progresses in the fourth multiplexer 800 according to the third embodiment.

FIG. 25 is a diagram showing the results of simulation for the way how light of three colors progresses in the fourth multiplexer 800 according to the third embodiment. Green light G that has entered into the third waveguide 103 transfers once to the second waveguide 102 in the first multiplexing unit 110, and after that transfers to the third waveguide 103 and propagates as it is, and then emits. Blue light B that has entered into the second waveguide 102 transfers to the third waveguide 103 in the first multiplexing unit 110 and propagates as it is, and then emits. In addition, red light R that has entered into the fourth waveguide 104A repeatedly transfers to and returns from the first waveguide 101 in the third multiplexing unit 130, while the light gradually transfers to the second and third waveguides 102 and 103 that are located slightly far away in the second multiplexing unit 120 and in the first multiplexing unit 110, and finally transfers to the third waveguide 103 (in this location, the fourth waveguide 104A has been terminated or is far away, and the third multiplexing unit 130 does not exist).

Here, partial light of the second visible light (usually green light G) and the third visible light (usually blue light B) transfer to the first waveguide 101 and the fourth waveguide 104A via the second multiplexing unit 120 and the third multiplexing unit 130, however the amount of the transferred light can be reduced by adjusting the length of each multiplexing unit. In this manner, light of all colors emits through the emission end 103b of the same third waveguide 103.

In the case of the structure of the fourth multiplexer 800 in FIG. 24(2) as well, the arrangement where the ranges of the respective multiplexing units overlap in the light propagating direction, the relationship between the structures and the arrangement of the respective optical waveguides, installation of the entrance and emission ends in the first and fourth waveguides, the cross-sectional structure of the respective waveguides, and the characteristics of the multiplexer are as in the case of the structure shown in FIG. 22.

Next, examples according to the third embodiment are described.

The present examples respectively have the configuration of four types of multiplexers 500 through 800, which are respectively described in references to FIGS. 20, 22, and 24, and have first through fourth waveguides 101 through 104 and 104A and first through third multiplexing units 110 through 130. These optical waveguides are embedded within the clad layer 112 that is formed on a substrate 111. The substrate 111 is made of silicon Si, and the clad layer 112 is made of $SiO_2$ glass. The first multiplexing unit 110, the second multiplexing unit 120, and the third multiplexing unit 130 are optical directional couplers. Here, the wavelength of red light is 0.633 μm, the wavelength of green light is 0.521 μm, and the wavelength of blue light is 0.448 μm. The first waveguide 101, the second waveguide 102, the third waveguide 103, and the fourth waveguide 104 and 104A have a waveguide width (w) of 2.1 μm and a waveguide height (h) of 1.6 μm. The distance between the waveguides (d) is 3.2 μm in the first multiplexing unit 110 and in the third multiplexing unit 130, and is 4 μm in the second multiplexing unit 120. The difference in the refractive index between the core and the clad is 0.8%.

The characteristics of each multiplexer having the above-described structure are as follows.

(1) In Case of First Multiplexer 500 in FIG. 20

In the case where the cross-section of the waveguides is rectangular, it is obtained that the length of the multiplexer is 1.6 mm and the average light multiplexing efficiency of three colors is 70%. In addition, the yield of the manufacture for the multiplexer can be increased by approximately 20% by making the cross-section of the waveguides be trapezoidal.

(2) In Case of Second Multiplexer 600 with Structure in FIG. 22

In the case where the cross-section of the waveguides is rectangular, it is obtained that the length of the multiplexer is 2 mm and the average light multiplexing efficiency of the three colors is 87%. In addition, the yield of the manufacture for the multiplexer can be increased by approximately 20% by making the cross-section of the waveguides be trapezoidal.

(3) In Case of Third Multiplexer 700 with Structure in FIG. 24(1)

In the case where the cross-section of the waveguides is rectangular, it is obtained that the length of the multiplexer is 1.8 mm and the average light multiplexing efficiency of the three colors is 92%. In addition, the yield of the manufacture for the multiplexer can be increased by approximately 20% by making the cross-section of the waveguides be trapezoidal.

(4) In Case of Fourth Multiplexer 800 with Structure in FIG. 24(2)

In the case where the cross-section of the waveguides is rectangular, it is obtained that the length of the multiplexer is 1.5 mm and the average light multiplexing efficiency of the three colors is 85%. In addition, the yield of the manufacture for the multiplexer can be increased by approximately 20% by making the cross-section of the waveguides be trapezoidal.

The invention claimed is:

1. An optical multiplexer comprising:
a first optical waveguide;
a second optical waveguide; and
at least one multiplexing unit, wherein
the first optical waveguide has a first mode coupling region and the second optical waveguide has a second mode coupling region, and the first mode coupling region and the second mode coupling region have a predetermined length and are proximate to each other with a gap having a predetermined width in between,
the first and second optical waveguides in the first and second mode coupling regions form the multiplexing unit,
light transfers between the first and second optical waveguides in the first and second mode coupling regions in the multiplexing unit,
first light in the first optical waveguide in the first mode coupling region and second light in the first optical waveguide in the first coupling region or the second optical waveguide in the second mode coupling region are multiplexed to one of the first and second optical waveguides in the first and second mode coupling regions in the multiplexing unit,
the first light and the second light have different wavelengths, and
a core cross-section of the first and second optical waveguides at least in the first and second mode coupling regions in the first and second optical waveguides has a top base and a bottom base having different lengths, and ratio of a length of the top base to a length of the bottom base is 0.95 or less.

2. The optical multiplexer according to claim 1, wherein a shape of the core cross-section of the first and second optical waveguides at least in the first and second mode coupling regions is any of a trapezoid, a pseudo-trapezoid, a shape where a plurality of rectangles having different widths are layered each other and a shape where the gap between adjacent cores is partially filled in with a core material.

3. The optical multiplexer according to claim 2, wherein the pseudo-trapezoid is either a trapezoid where any of a lateral side, the top base, and the bottom base is a curve or a trapezoid where the inner angle between the top base and a lateral side or the outer angle between a lateral side and the bottom base is rounded.

4. The optical multiplexer according to claim 1, wherein
the first optical waveguide and the second optical waveguide are waveguides where light propagation in a basic mode is the largest component of light propagation, and
a multimode optical waveguide is arranged between the first optical waveguide in the first mode coupling region and the second optical waveguide in the second mode coupling region.

5. The optical multiplexer according to claim 1, wherein
a second wavelength of the second light is shorter than a first wavelength of the first light, and
the first light transfers from the first optical waveguide in the first mode coupling region to the second optical waveguide in the second mode coupling region, and the second light propagates straight forward through the second optical waveguide in the second mode coupling region so that the first and second light is multiplexed to the second optical waveguide in the second mode coupling region.

6. The optical multiplexer according to claim 1, wherein
a second wavelength of the second light is shorter than a first wavelength of the first light, and
the first light transfers from the first optical waveguide in the first mode coupling region to the second optical waveguide in the second mode coupling region and after that, finally returns to the first optical waveguide in the first mode coupling region, and the second light transfers from the second optical waveguide in the second mode coupling region to the first optical waveguide in the first mode coupling region so that the first and second light is multiplexed to the first optical waveguide in the first mode coupling region.

7. The optical multiplexer according to claim 1, wherein
a second wavelength of the second light is shorter than a first wavelength of the first light, and
the first light transfers from the first optical waveguide in the first mode coupling region to the second optical waveguide in the second mode coupling region, and after that, returns to the first optical waveguide in the first mode coupling region, and then finally transfers to the second optical waveguide in the second mode coupling region, and the second light transfers from the first optical waveguide in the first mode coupling region to the second optical waveguide in the second mode coupling region so that the first and second light is multiplexed to the second optical waveguide in the second mode coupling region.

8. The optical multiplexer according to claim 1, wherein the first light is red and the second light is blue.

9. A method for manufacturing the optical multiplexer according to claim 1, comprising the step of patterning a core layer including a core material into the first optical waveguide and the second optical waveguide.

10. An optical multiplexer, comprising:
a first optical waveguide having a first mode coupling region;
a second optical waveguide having a second mode coupling region that is adjacent to the first optical waveguide;
a third optical waveguide having a third mode coupling region that is adjacent to the second optical waveguide on the opposite side from the first optical waveguide; and
a fourth optical waveguide having a fourth mode coupling region that is adjacent to the first optical waveguide on the opposite side from the second optical waveguide, wherein
the third mode coupling region and the second mode coupling region are arranged to be proximate to each other with a first gap width in between over a first length so as to form a first multiplexing unit,
the second mode coupling region and the first mode coupling region are arranged be proximate to each other with a second gap width in between over a second length so as to form a second multiplexing unit,
the first mode coupling region and the fourth mode coupling region are arranged to be proximate to each other with a third gap width in between over a third length so as to form a third multiplexing unit,
first light having a first wavelength is entered into the first or fourth optical waveguide,
second light having a second wavelength shorter than the first wavelength is entered into the second optical waveguide, third light having a third wavelength shorter than the first wavelength and different from the second wavelength is entered into the third optical waveguide, the first through third light is multiplexed to the second mode coupling region in the second optical waveguide or to the third mode coupling region in the third optical waveguide so as to be emitted from an optical waveguide that is connected to the second or the third mode coupling region, and the first through third multiplexing units are arranged to overlap each other in a light propagating direction from the entrance side to the emission side of the first through third light.

11. The optical multiplexer according to claim 10, wherein
the first and third gap widths are approximately same, and
the second gap width is greater than the first and third gap widths.

12. An optical multiplexer, comprising:
a first optical waveguide having a first mode coupling region;
a second optical waveguide having a second mode coupling region that is adjacent to the first optical waveguide;
a third optical waveguide having a third mode coupling region that is adjacent to the second optical waveguide on the opposite side from the first optical waveguide; and
a fourth optical waveguide having a fourth mode coupling region that is adjacent to the first optical waveguide on the opposite side from the second optical waveguide, wherein
the third mode coupling region and the second mode coupling region are arranged to be proximate to each other with a first gap width in between over a first length so as to form a first multiplexing unit,
the second mode coupling region and the first mode coupling region are arranged be proximate to each other with a second gap width in between over a second length so as to form a second multiplexing unit,
the first mode coupling region and the fourth mode coupling region are arranged to be proximate to each other with a third gap width in between over a third length so as to form a third multiplexing unit,
first light having a first wavelength is entered into the first or fourth optical waveguide,
second light having a second wavelength shorter than the first wavelength is entered into the second optical waveguide,
third light having a third wavelength shorter than the first wavelength and different from the second wavelength is entered into the third optical waveguide,
the first through third light is multiplexed to the second mode coupling region in the second optical waveguide or to the third mode coupling region in the third optical waveguide so as to be emitted from an optical waveguide that is connected to the second or the third mode coupling region, and
the first through third multiplexing units are arranged to overlap each other in a light propagating direction from the entrance side to the emission side of the first through third light,
wherein heights, widths, and gap widths of the first through fourth optical waveguides are symmetric between left and right in a cross-sectional diagram in a location where the first through third multiplexing units overlap in a direction perpendicular to the light propagating direction.

* * * * *